United States Patent
Sakura

(10) Patent No.: US 8,298,104 B2
(45) Date of Patent: *Oct. 30, 2012

(54) TIMING CHAIN DRIVING SYSTEM

(75) Inventor: Shunji Sakura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 237 days.

This patent is subject to a terminal disclaimer.

(21) Appl. No.: 12/636,900

(22) Filed: Dec. 14, 2009

(65) Prior Publication Data

US 2010/0173739 A1     Jul. 8, 2010

(30) Foreign Application Priority Data

Jan. 8, 2009   (JP) ................................. 2009-002495

(51) Int. Cl.
  *F16H 7/06* (2006.01)
  *F16H 55/30* (2006.01)
  *F16G 13/04* (2006.01)
(52) U.S. Cl. ......... 474/156; 474/164; 474/213; 474/231
(58) Field of Classification Search .................. 474/152, 474/153, 155, 156, 157, 164, 202, 206, 212, 474/213, 226, 228, 230, 231
  See application file for complete search history.

(56) References Cited

U.S. PATENT DOCUMENTS

| | | | | |
|---|---|---|---|---|
| 4,832,668 A | * | 5/1989 | Ledvina et al. | 474/155 |
| 5,690,571 A | * | 11/1997 | Mott | 474/212 |
| 6,656,072 B2 | * | 12/2003 | Sugita et al. | 474/161 |
| 2009/0170648 A1 | | 7/2009 | Nakano et al. | |
| 2009/0247337 A1 | | 10/2009 | Sakura et al. | |
| 2009/0247340 A1 | | 10/2009 | Sakura et al. | |

FOREIGN PATENT DOCUMENTS

JP   56-028338 A   3/1981

OTHER PUBLICATIONS

U.S. Appl. No. 12/611,416, filed Nov. 3, 2009.
U.S. Appl. No. 12/616,342, filed Nov. 11, 2009.

* cited by examiner

*Primary Examiner* — William E Dondero
(74) *Attorney, Agent, or Firm* — Howson & Howson LLP

(57) ABSTRACT

In a timing chain drive, a hybrid driving sprocket, having roller-engaging teeth and side sprocket teeth, cooperates with a hybrid chain having rollers that mesh with the roller-engaging teeth and toothed link plates that mesh with the side sprocket teeth. A driven sprocket from which the chain travels toward the driving sprocket has a cyclically varying tooth pitch that compensates for tension variations due to cyclic variations in the rotational speed of the driving sprocket or to cyclic variations in the load applied to the driven sprocket. The driven sprocket can be a roller sprocket or a hybrid sprocket having roller-engaging teeth and side sprocket teeth for engagement with the teeth on the link plates of the chain.

2 Claims, 20 Drawing Sheets

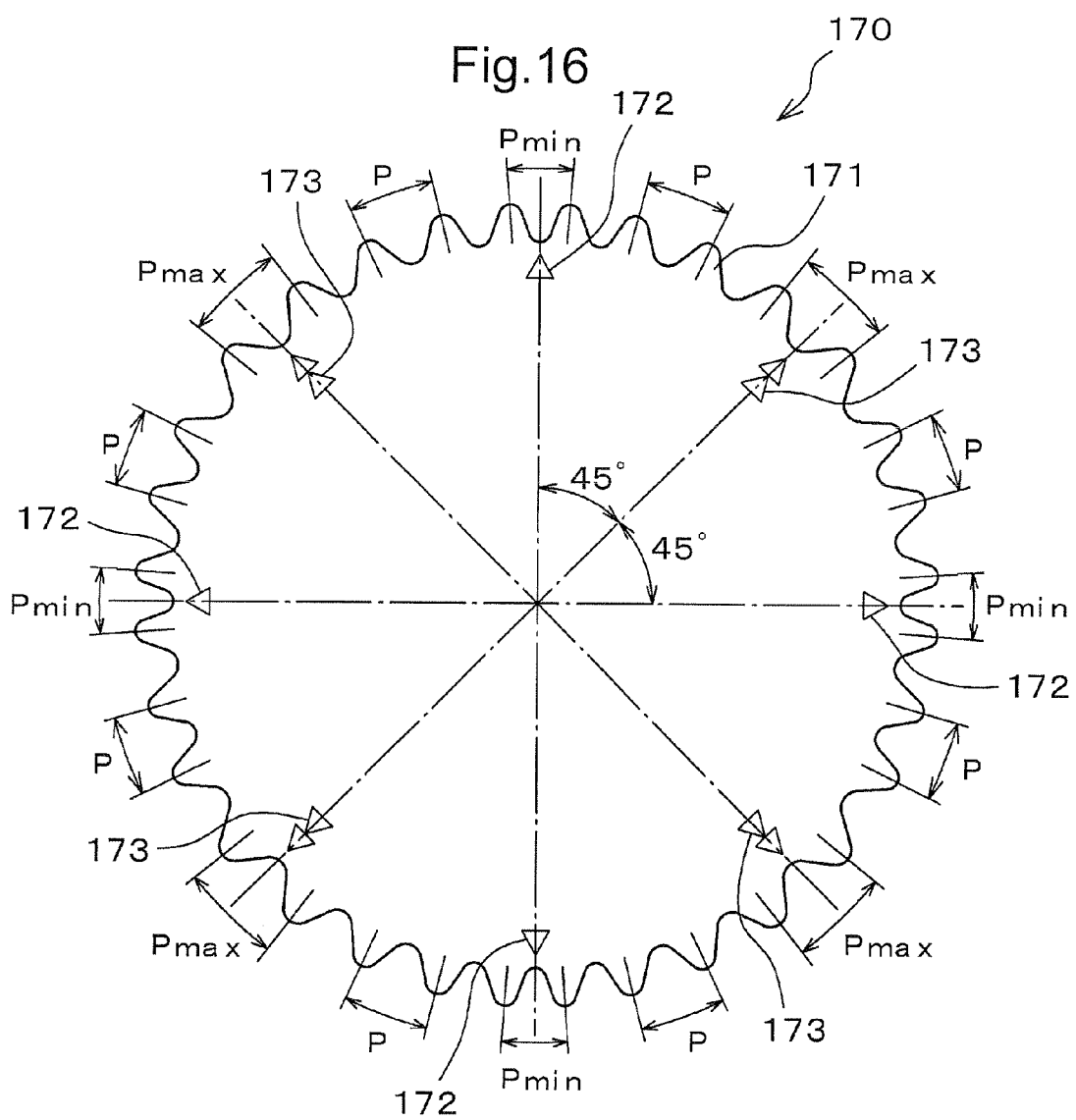

Fig.19a
[FLUCTUATION OF SPEED OF CRANKSHAFT]
(rpm)
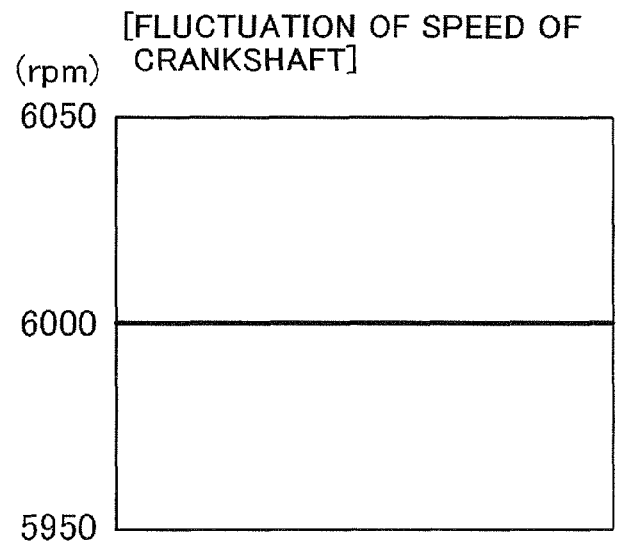
[FLUCTUATION OF POSITION OF RIGHT CAMSHAFT AT DISENGAGING POINT]
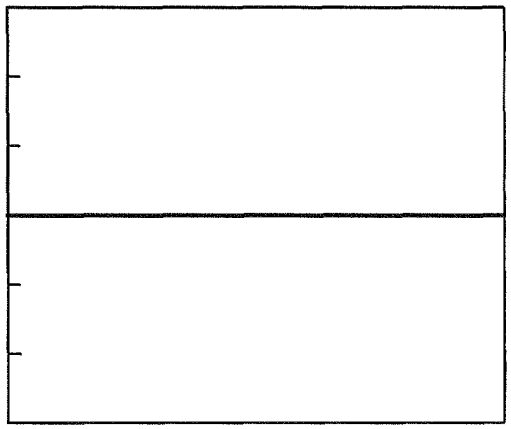
[TENSION OF CHAIN IN TENSION- SIDE (RIGHT-SIDE) SECTION]
(N)
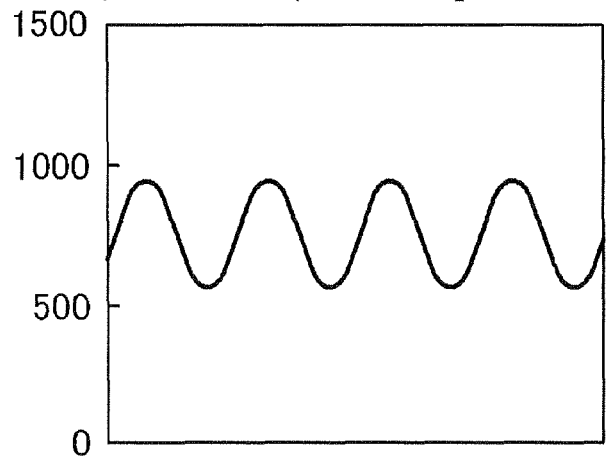

Fig.19b
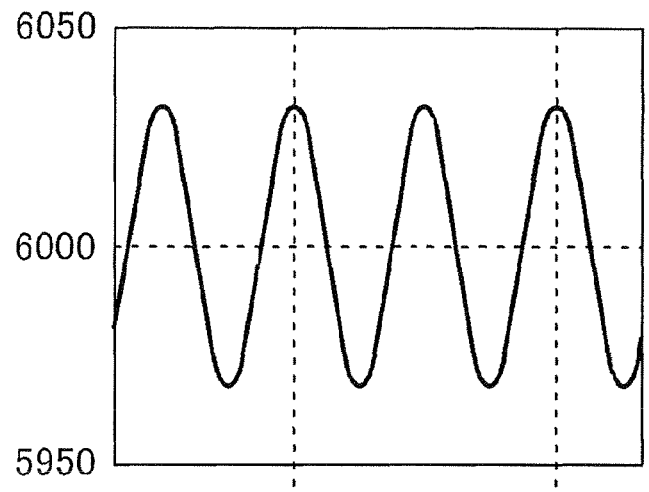
1 ROTATION
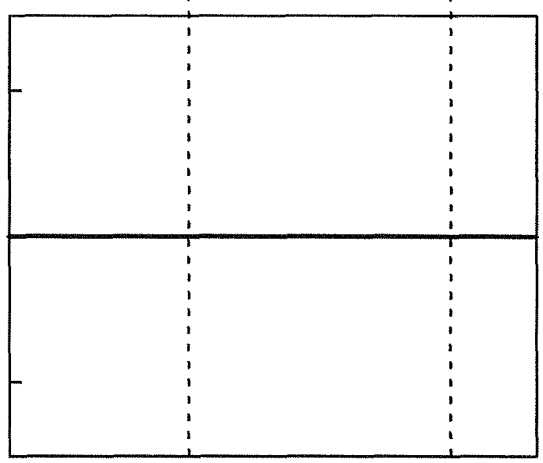
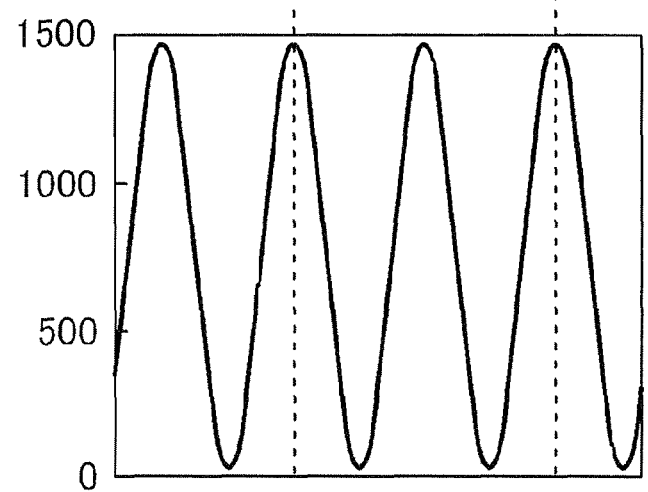

TIMING CHAIN DRIVING SYSTEM

CROSS REFERENCE TO RELATED APPLICATIONS

This application claims foreign priority benefit, under Title 35, United States Code §119 (a)-(d), of Japanese Patent Application No. 2009-002495, filed in the Japan Patent Office on Jan. 8, 2009. The disclosure of Japanese Patent Application No. 2009-002495 is herein incorporated by reference in its entirety.

FIELD OF THE INVENTION

The invention relates to a timing chain driving system for conveying power through a chain engaged with driving and driven sprockets and suitable for driving a shaft of an auxiliary unit associated with an engine, such as a valve-actuating camshaft or an oil pump.

BACKGROUND OF THE INVENTION

Conventional timing chain driving systems typically use a roller chain, a rollerless bushing chain, or a silent chain. It is also known to use a hybrid timing chain, in which links of a silent chain and links of a roller chain are combined, in conjunction with specially designed sprockets having plural sets of teeth for meshing with the rollers and with the silent chain teeth, respectively.

As shown in FIG. 21, this known hybrid timing chain driving system comprises a chain 510 in which link plates 511 on the outsides of the chain each have a pair of teeth so that they function as a silent chain, and toothless inner link plates 512 along with rollers 520 function as a roller chain. The link plates and rollers are connected by pins 530. As shown in FIG. 22, a sprocket 550 of the driving system has side teeth 552 for engagement with the silent chain teeth on plates 511. These teeth 552 are formed on the both sides of a central set of sprocket teeth 551 for engagement with the rollers 520.

An example of a typical hybrid chain transmission is described in Japanese Patent Publication No. Shoo 59-30936. In operation of the hybrid chain transmission, power is transmitted by engagement of the teeth of the link plates 511 with the side sprocket teeth 552, so that the transmission functions as a silent chain transmission. The rollers 520 abut the sprocket teeth 551 when the teeth of the link plates 511 become seated on the side sprocket teeth 552.

SUMMARY OF THE INVENTION

In a conventional timing drive using a silent chain, the chain gradually elongates as a result of wear of its connector pins, and, as a result, its strength decreases over time. On the other hand, although wear elongation is not as great a problem in the case of a roller chain, a roller chain generates a large amount of noise on engagement with a sprocket.

The problem of chain elongation due to wear of the connector pin, and the resulting reduction in the strength of the chain can be alleviated to some extent by a hybrid chain transmission that includes not only link plate teeth that function as silent chain teeth, but also rollers that abut roller-engaging sprocket teeth on a hybrid sprocket. These problems, however, are not fully overcome because normal transmission is still effected by engagement of the link plate teeth with sprocket teeth. Moreover, there has been another problem, namely, that noise is generated by periodic vibrations at a frequency that depends on the number of sprocket teeth.

There is also the possibility that the peak value of tension fluctuation becomes excessive due to fluctuations in load torque on the driven sprocket or fluctuations in the rotational speed of the driving sprocket. As a result of the high peak value of chain tension, it has been necessary to adopt a chain having a tensile strength sufficiently large to sustain the maximum tensile force. The known timing chain driving system does not take tension fluctuations into account, and because it must be sufficiently strong to sustain the maximum chain tension, it is necessarily heavy. As a result of the increased weight of the chain, an excessive amount of noise is generated. In addition, the heavy weight of the timing chain driving system hampers efforts toward downsizing, weight reduction and noise reduction.

Accordingly, objects of the invention include one or more of the following. One object is to solve the problems described above by providing a timing chain driving system that can be downsized and/or reduced in weight, while preventing the strength of the chain from dropping due to elongation as a result of wear of its connector pins. Another is to reduce the noise generated as the chain engages sprockets of the driving system. Still another is to prevent vibration and noise caused by the tension fluctuations.

The timing chain driving system according to a first aspect of the invention comprises a driving sprocket, at least one driven sprocket, and a chain in meshing engagement with the sprockets for conveying rotational force from the driving sprocket to each driven sprocket while maintaining the angular rotations of the sprockets in a predetermined phase relationship. The chain comprises outer links and inner links in alternating, overlapping relationship. Each outer link comprises a pair of outer link plates in laterally spaced relationship, and the outer link plates of each pair are connected by a pair of connecting pins secured respectively in front and rear pin holes in the pair of outer link plates. Each inner link comprises a pair of inner link plates in laterally spaced relationship, and the inner link plates of each pair are connected by a pair of bushings secured respectively in front and rear bushing holes in the pair of inner link plates. Each connecting pin of each outer link extends through, and is rotatable in, a bushing of an overlapping inner link. Each of the outer link plates and each of the inner link plates are formed with front and rear link plate teeth. The driving sprocket has central sprocket teeth which engage with the bushings or with rollers rotatable on the bushings. Finally, the driving sprocket also has side sprocket teeth which engage with the link plate teeth.

By combining the functions of conventional silent and roller chains, it becomes possible to reduce noise and to prevent the strength of the chain from decreasing due to elongation caused by wear of the connector pins.

According to another aspect of the invention, the link plate teeth of the outer link plates have a shape different from that of the teeth of the inner link plates. As a result, the timing of engagement of the link plate teeth with the side sprocket teeth is shifted, and even when the chain drive is subject to large loads, it becomes possible to realize a considerable reduction in periodic vibration and noise and thereby reduce the noise generated by the drive system as a whole.

According to a third aspect of the invention, the teeth of the outer link plates and the teeth of the inner link plates have outer flanks whose shapes are the same, and inner flanks whose shapes are different. Positioning of the chain by contact of the outer flanks with the sprocket is uniform for all link plates, and hence the conveyance of power is stabilized. At the same time, periodic noise and vibration are reduced because engagement timing is shifted as a result of the different shapes of the inner flanks.

According to a fourth aspect of the invention, the inner flanks of the front and rear teeth of each of the outer and inner link plates have different shapes. Here again the timing of engagement of the link plate teeth with the side sprocket teeth and the timing of disengagement is shifted, and accordingly, periodic vibration and noise may be reduced.

According to a fifth aspect of the invention, side sprocket teeth which engage with link plate teeth are provided on the both sides of said central sprocket teeth. Power is conveyed homogeneously to both sides of the chain, and, as a result, vibration and noise may be still further reduced.

According to a sixth aspect of the invention, the pitch of the teeth of at least one driven sprocket cyclically increases and decreases around the periphery of the sprocket, the phase of the cyclic increase and decrease of said pitch is synchronized with fluctuations of rotational speed of the driving sprocket or with cyclic fluctuations in the load on the driven sprocket, and the pitch of the teeth of the driven sprocket, at the location at which the chain disengages therefrom is at a minimum as the rotational speed of the driving sprocket is maximum or as the load of the driven shaft reaches its peak. The cyclic pitch variation changes the effective length of the tension span of the chain, and thereby absorbs fluctuations in rotational speed and load without displacing or applying force to the chain in directions other than the direction of chain travel. When this cyclic pitch variation on the driven sprocket is combined with the hybrid driving sprocket, the whole driving system may be simplified, downsized, and made lighter in weight, and vibration and noise may be further reduced. In addition a reduction in the number of movable parts can also be realized.

According to a seventh aspect of the invention, at least one driven sprocket has roller- or bushing-engaging sprocket teeth that engage with rollers or bushings of the chain, and sprocket teeth on a side of the roller- or bushing-engaging sprocket teeth that engage with link plate teeth of the chain. By the use of a hybrid driven sprocket that incorporates features of a roller chain and a silent chain, it is possible to achieve a further reduction in noise, and to prevent loss of strength of the chain due to the elongation of the chain caused by wear of the connector pins.

According to an eighth aspect of the invention, where at least one driven sprocket has roller- or bushing-engaging sprocket teeth that engage with rollers or bushings of the chain, sprocket teeth are provided on both sides of the roller- or bushing-engaging sprocket teeth for engagement with link plate teeth of the chain. With driven side sprocket teeth provided on both sides of the driven roller sprocket teeth, power is conveyed homogeneously to the sprocket from both sides of the chain and the vibration and noise may be reduced further.

BRIEF DESCRIPTION OF DRAWINGS

FIG. 16 is a schematic elevational view of a driven sprocket according to the first embodiment of the invention, showing the roller-engaging teeth of the driven sprocket;

DETAILED DESCRIPTION OF THE PREFERRED EMBODIMENTS

Figure 1:
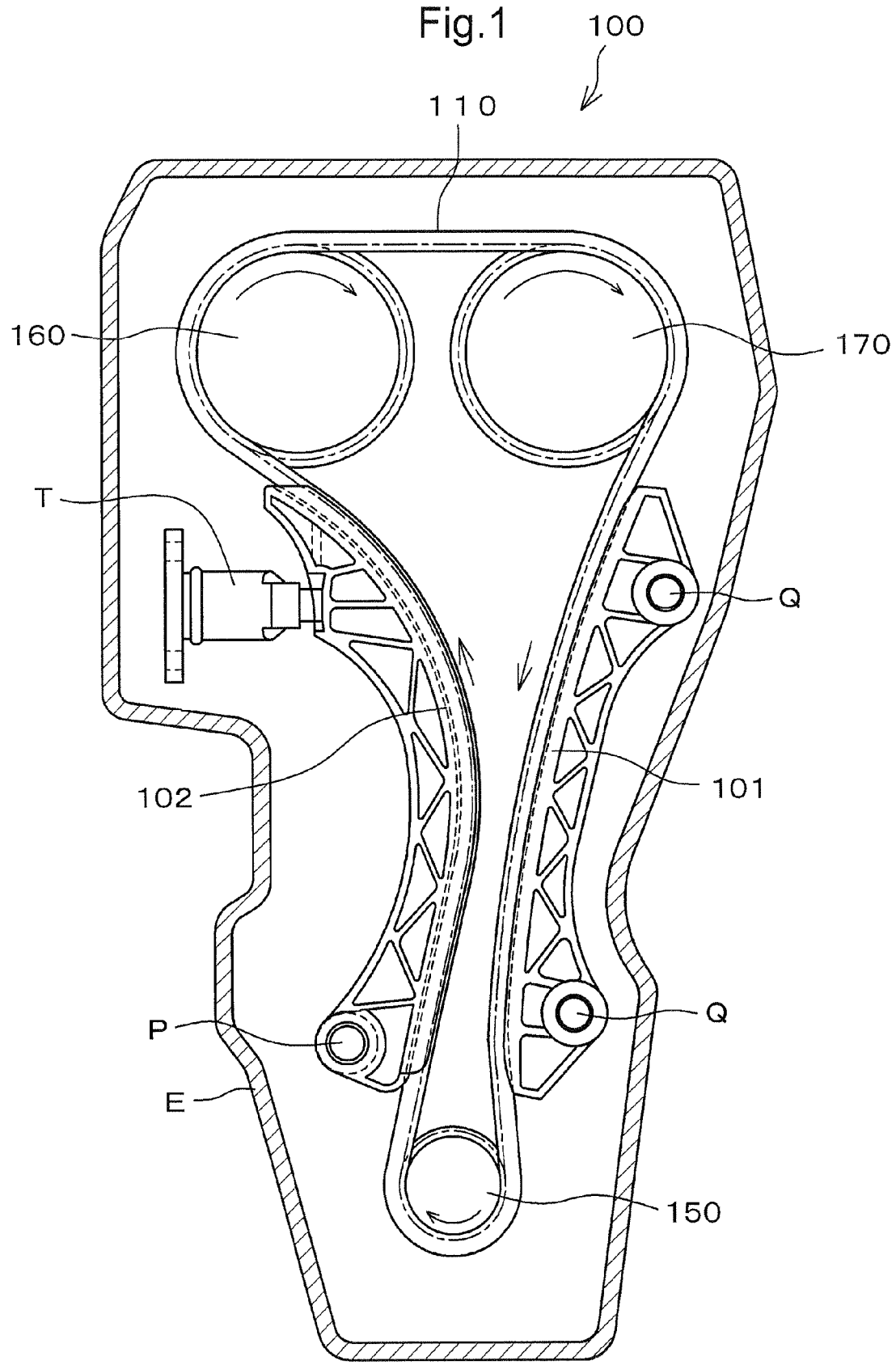
FIG. 1 is an elevational view, partly in cross-section, of a timing chain driving system according to the invention.

The arrangement of the timing chain driving system of the invention can take any form as long as the system has the following features and advantages. The timing chain driving system has one driving sprocket, one or more driven sprockets, and an endless chain in meshing engagement with the sprockets for transmitting rotational force. The driving and driven sprockets are arranged so that their phases are synchronized in a predetermined relationship. The chain is composed of a large number of outer links and inner links in alternating relationship. Connector pins are fitted to front and rear pin holes the outer link plates, and bushings are fitted to front and rear bushing holes the inner link plates. Rollers rotatable on the bushings may be provided. The inner and outer links are interconnected in alternating relationship by insertion of the connecting pins of the outer links rotatably through bushings of the inner links.

Each of the outer and inner link plates is formed with two link plate teeth respectively at the front and rear along the advancing direction of the chain.

The driving sprocket has driving sprocket teeth that engage in driving relationship with the bushings or rollers of the chain, and side sprocket teeth that engage in driving relationship with link plate teeth disposed at least one side of the driving sprocket teeth.

The timing chain driving system prevents the strength of the chain from decreasing with elongation caused by wear of connector pins, reduces noise generated when the chain engages with the sprockets, and makes it possible to downsize and reduce the weight of the driving system while preventing vibration and noise chain due to fluctuations in chain tension.

The chain driving system of the invention can be used to drive the driven shaft of a valve actuating system or an auxiliary device such as an engine oil pump. It is also applicable to other power transmission mechanisms and conveying mechanisms.

Each of the outer and inner links of the chain may comprise only a pair of link plates. However, additional link plates can be incorporated into the inner or outer links or into the inner and outer links. When additional inner link plates are provided, teeth can be absent from some of the inner link plates. Optionally, rollers can be eliminated so that the chain is a rollerless bushing chain.

The driving sprocket of the timing chain driving system of the invention can comprise a single set of roller sprocket teeth with side sprocket teeth provided on one side or on both sides of the roller sprocket teeth. Alternatively, plural sets of roller sprocket teeth can be provided, with one or more sets of side sprocket teeth fixed in coaxial relationship with the roller sprocket teeth.

In the timing chain driving system of the invention, the driving sprocket has roller sprocket teeth and side sprocket teeth. The driven sprockets can have roller-engaging teeth without side sprocket teeth, or can have side sprocket teeth without roller-engaging teeth.

As shown in FIG. 1, the timing chain driving system 100 conveys power by means of a chain 110 in mesh with a driving sprocket 150 and driven sprockets 160 and 170. A slack side chain guide 102, in sliding contact with the part of chain 110 returning from driving sprocket 150 to driven sprocket 160, cooperates with a tensioner T to apply tension to the chain in order to prevent vibration and side run-out of the chain.

A tension side guide 101 is in sliding engagement with the portion of the chain traveling from driven sprocket 170 toward driving sprocket 150. The tension side guide 101 guides the chain and restricts the length of the span of the chain extending from a disengagement point on the driven sprocket 170 to an engagement point on the driving sprocket 150).

The slack side chain guide 102 is pivotally attached to an inner wall of an engine frame E on a pivot shaft P, which can be a mounting bolt or a mounting pin. A shoe on the pivoted chain guide 102 is biased toward the chain 110 by the tensioner T.

The tension-side chain guide 101 is fixed to the inner wall of the engine frame E by a mounting bolts Q or other suitable fixing means guide and restrict the traveling orbit of the circularly traveling chain 110.

Figure 2:
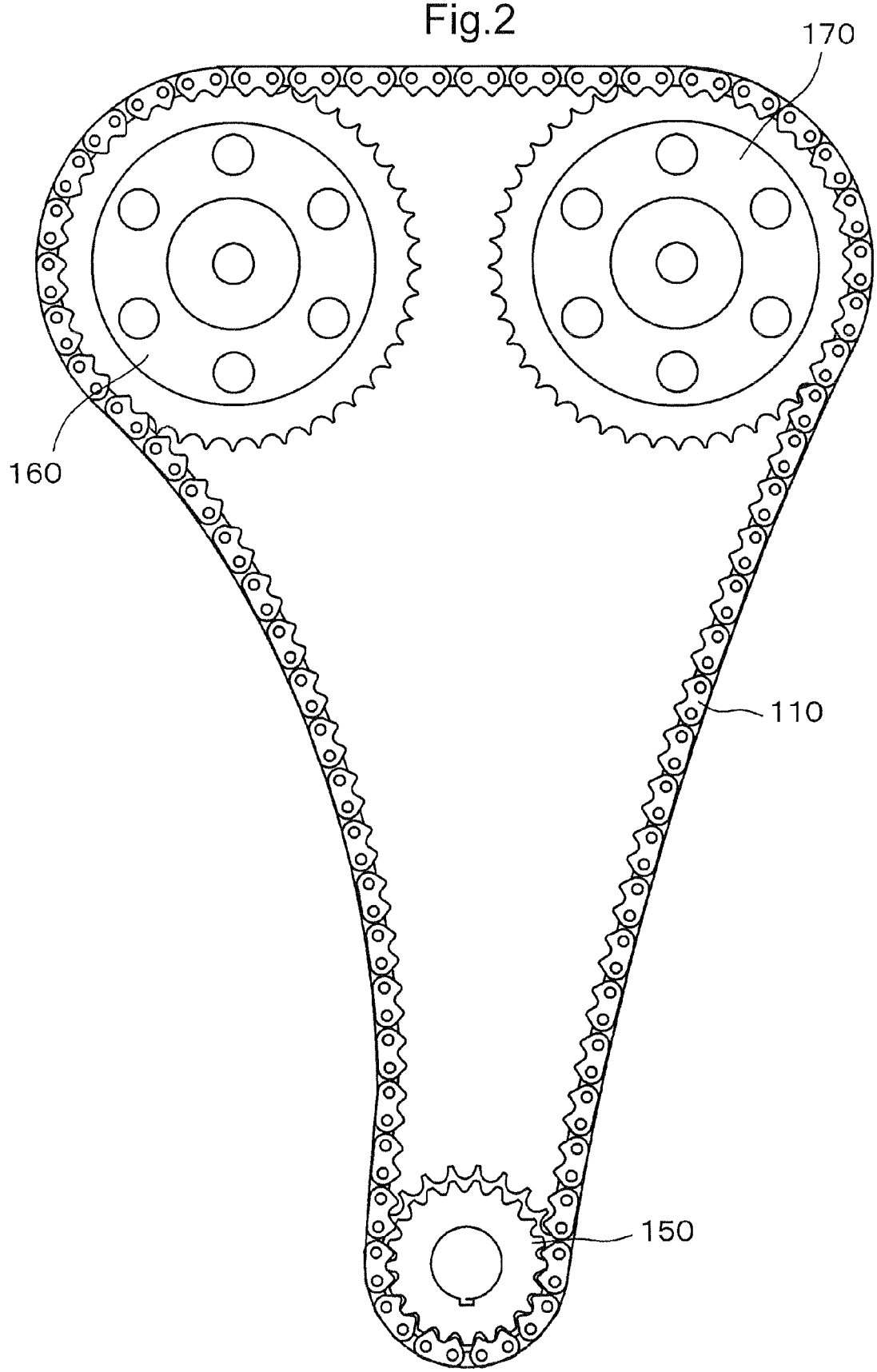
FIG. 2 is a schematic elevational view of a chain and sprockets in a timing chain driving system according to a first embodiment of the invention.
Figure 3:
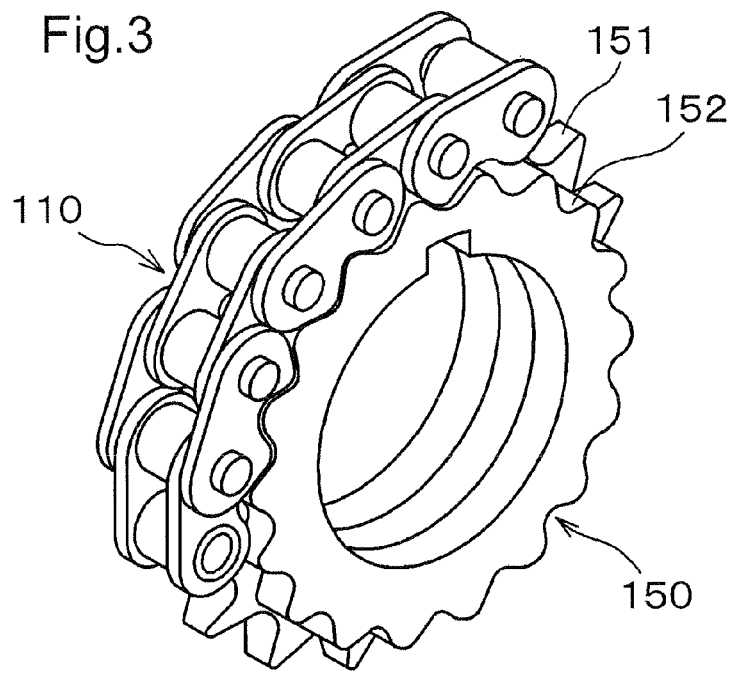
FIG. 3 is a perspective view of a driving sprocket and a part of the timing chain in FIG. 2.
Figure 4:
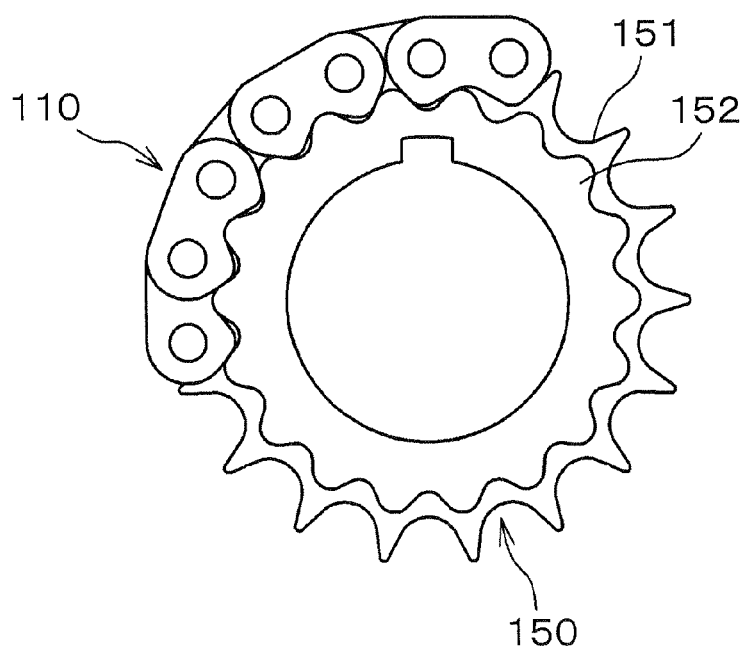
FIG. 4 is an elevational view of the chain and sprocket of FIG. 3.

As shown in FIGS. 2 through 4, the driving sprocket 150 of the timing chain driving system according to the first embodiment of the invention has roller-engaging sprocket teeth that engage in driving relationship with rollers of the chain 110, and side sprocket teeth, on the sides of the roller-engaging sprocket teeth, that engage in driving relationship with the link plates of the chain.

As shown in FIG. 2, the driven sprockets 160 and 170 have only roller-engaging sprocket teeth. The tooth pitch on the tension-side driven sprocket 170 periodically increases and decreases along the peripheral direction. The phase of the periodic increase and decrease of the tooth pitch on sprocket 170 is synchronized either with fluctuations in the rotational speed of the driving sprocket or with periodic fluctuations in the load applied to sprocket 170 through its driven shaft.

Figure 5:
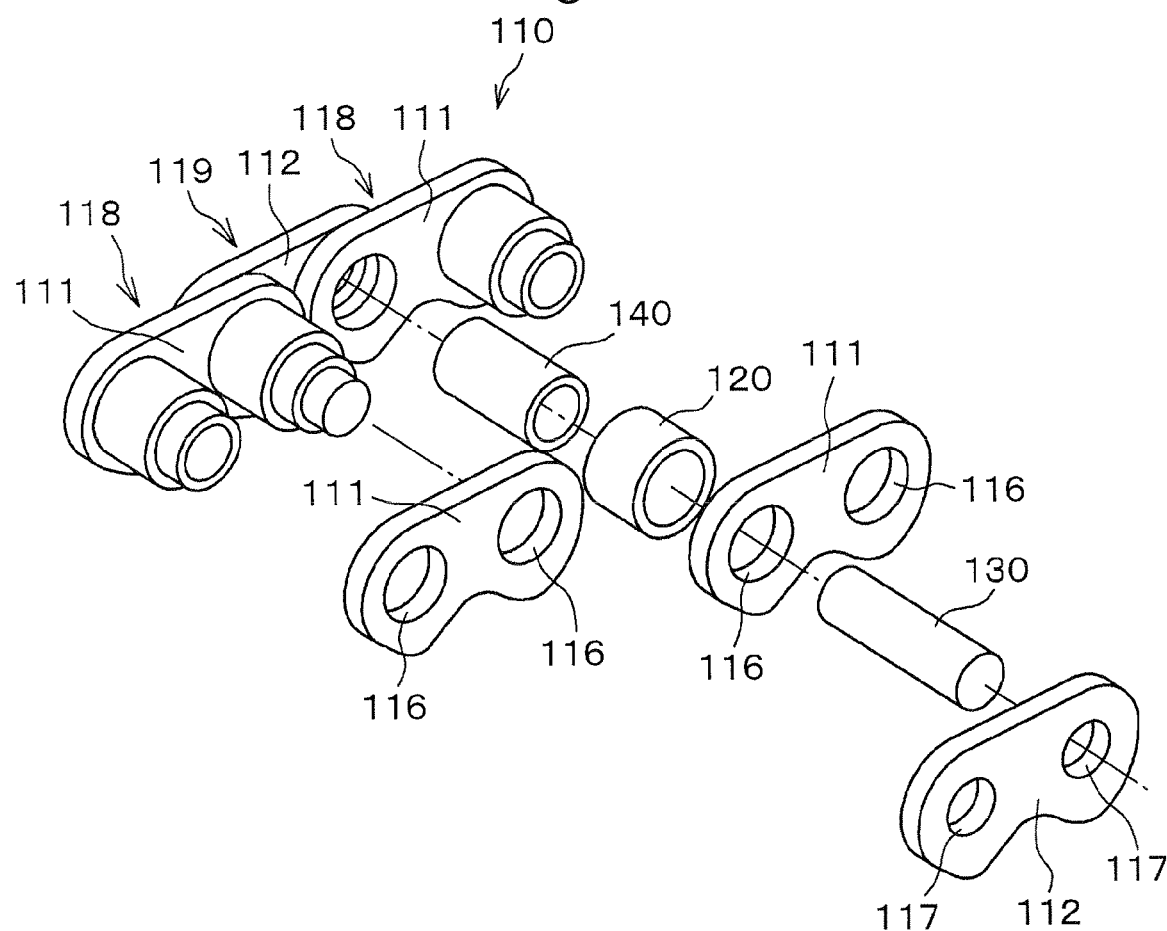
FIG. 5 is an exploded perspective view of the chain of FIG. 2.

As shown in FIG. 5, the chain 110 is constructed by connecting outer the plates 112 of each outer link 119 by a pair of connecting pins 130, the ends of which are securely fitted into front and rear pin holes 117 of the outer link plates 112. The plates 111 of the inner links 118 are connected by a pair of bushings 140 which are fitted securely to front and rear bushing holes 116 in the inner link plates 111. The inner and outer links are connected in alternating, articulating, relationship by insertion of the connector pins 130 rotatably through the bushings 140. A roller 120 is rotatable on each bushing 140.

Figure 6:
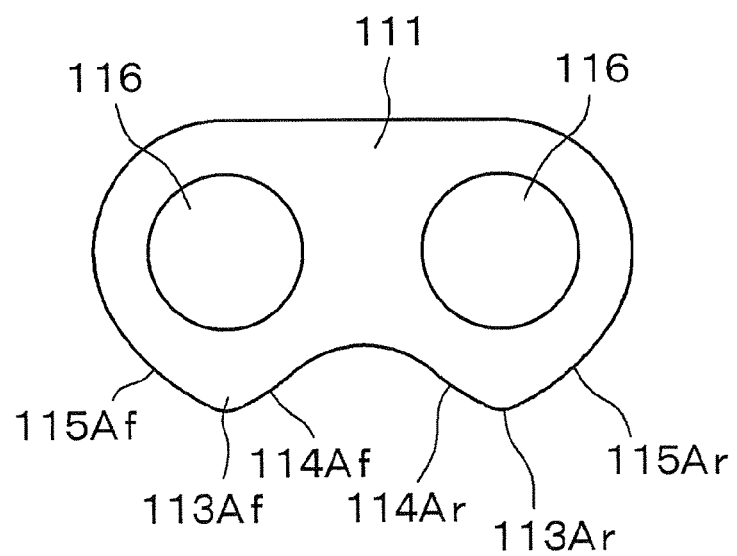
FIG. 6 is an elevational view of an inner link plate of the chain of FIGS. 2-5.

As shown in FIG. 6, the inner link plate 111 has bushing holes 116 at the front and rear parts thereof, and has link plate teeth 113Af and 113Ar respectively under the front and rear bushing holes 116. The link plate teeth 113Af and 113Ar have inner flanks 114Af and 114Ar that face each other, and outer flanks 115Af and 115Ar.

Figure 7:
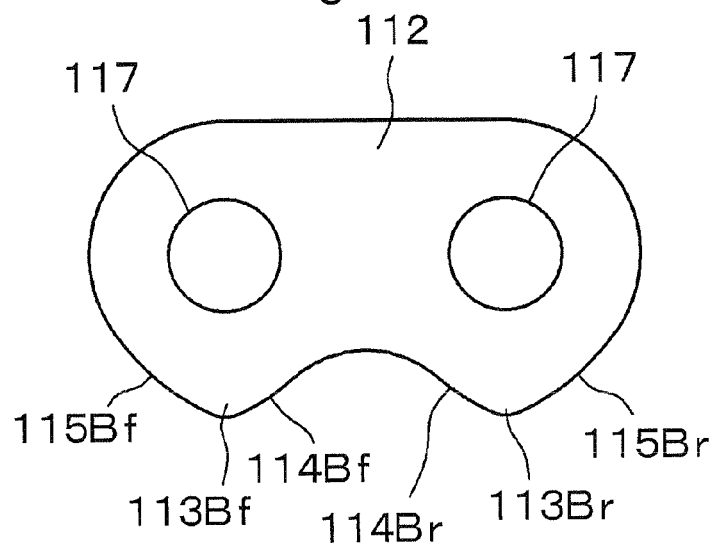
FIG. 7 an elevational view of an outer link plate of the chain of FIGS. 2-5.

As shown in FIG. 7, the outer link plate 112 has front and rear pin holes 117, and link plate teeth 113Bf and 113Br respectively under the front and rear pin holes 117. The link plate teeth 113Bf and 113Br have mutually facing inner flanks 114Bf and 114Br and outer flanks 115Bf and 115Br.

The shapes of the inner flanks 114Af and 114Ar of the inner link plates 111 can be slightly different from each other and slightly different from the shapes of inner flanks 114Bf and 114Br of the outer link plates, which can also be different from each other. On the other hand, the outer flanks 115Af, 115Ar, 115Bf and 115Br can have the same shape. Alternatively the inner flanks 114Af, 114Ar, 114Bf and 114Br can have the same shape.

Figure 8:
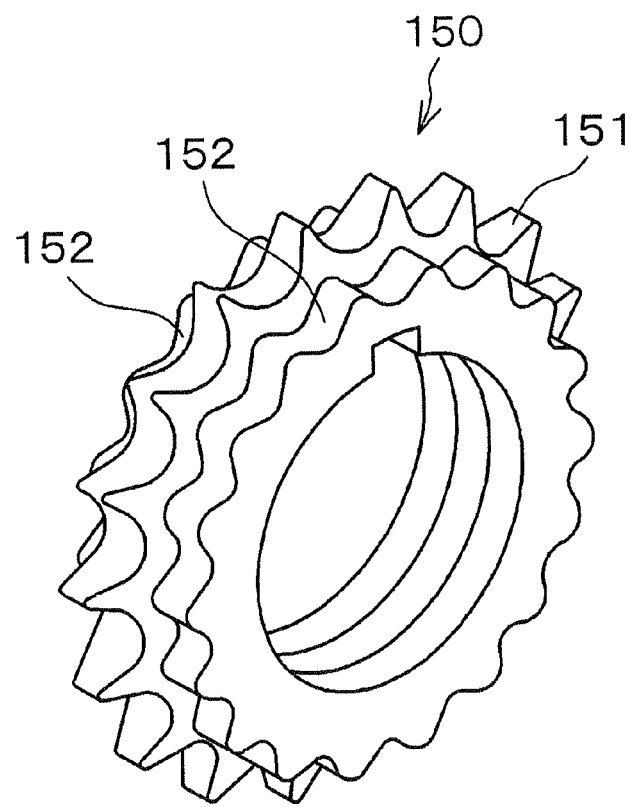
FIG. 8 is a perspective view of the driving sprocket of FIG. 2.
Figure 9:
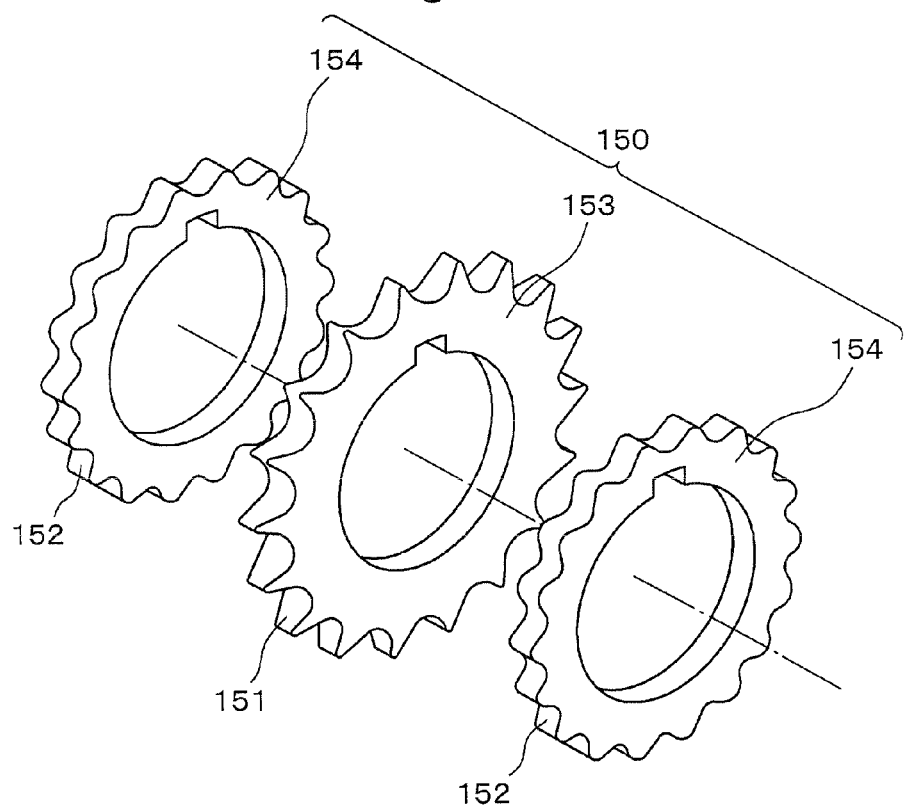
FIG. 9 is an exploded perspective view of the driving sprocket of FIG. 8.

As shown in FIGS. 8 and 9, the driving sprocket 150 is composed of a center driving sprocket 153 having roller-driving sprocket teeth 151 that engage with the rollers 120 of the chain 110, and side driving sprockets 154 having side sprocket teeth 152 that engage the link plate teeth 113Af, 113Ar, 113Bf and 113Br of the chain 110. The side driving sprockets 154 are disposed on both sides of the center driving sprocket 153 and the three sprockets may be keyed so that they rotate together as a unit. Alternatively, by the use of special manufacturing techniques, the roller-driving teeth 151 and the side sprocket teeth 152 can be formed on a single unitary member.

The shapes of the link plate teeth 113Af, 113Ar, 113Bf and 113Br, the roller-driving sprocket teeth 151, and the driving side sprocket teeth 152, are formed so that, when the chain 110 begins to engage the driving sprocket 150, the inner flanks 114Af of the front teeth of the inner and outer link plates first contact the side sprocket teeth 152. Then, the front roller 120 of the inner link plates 111 contacts the roller-driving sprocket teeth 151, and the rear roller 120 seats on a tooth gap bottom between a pair of roller-driving sprocket teeth. At this time, the outer flanks 115Af and 115Ar contact side sprocket teeth 152.

When the chain 110 disengages from the driving sprocket 150, a roller 120 on the rear side of a preceding outer link plate 112, i.e., the roller 120 on the front side of an inner link plate 111, disengages from a tooth gap bottom of the roller driving sprocket teeth 151 as the inner flank 114Bf of the link plate tooth 113Bf positioned on the rear side of the advancing direction of the preceding link plate 112 contacts a driving side sprocket tooth 152. Then, the outer flank 115Af of the link plate tooth 113Af positioned on the rear-side of the advancing direction of the inner link plate 111 and also the outer flank 115Ar of the link plate tooth positioned on the rear-side of the advancing direction disengage from a driving side sprocket tooth 152. Then, the inner flank 114Af of the link plate tooth 113Af positioned on the rear side of the advancing direction of the inner link plate 111 contacts a driving side sprocket tooth 152 and the roller 120 on the rear-side of the advancing direction of the inner link plate 111 disengages from the driving roller sprocket teeth 151.

A standard tooth shape can be adopted for the roller driving sprocket teeth 151, and the shapes of the link plate teeth 113 and the driving side sprocket teeth 152 can be set so that the operation described above is enabled.

The operation of the chain 110 and the driving sprocket 150 according to the first embodiment of the invention arranged as described above will be explained with reference to FIGS. 10 through 15, which show sequential stages of engagement of the chain with the driving sprocket 150 as the sprocket rotates counterclockwise. For the purpose of explanation, the driving sprocket 150 is shown in a fixed position, and the chain 110 is shown bending around the sprocket in sequential stages.

In FIGS. 10 through 15, the respective link plates are designated L1, L2, and L3, link plate L1 being the frontmost link plate of the three in the direction of chain advancement. The respective rollers are designated R1, R2, and R3 in the same order.

The front link plate teeth of the respective link plates L1, L2 and L3 are designated H1$f$, H2$f$, and H3$f$, and the rear teeth are designated H1$r$ and H2$r$. The outer flanks of the respective link plate teeth are designated G1$f$, G2$f$, and G1$r$, and inner flanks are designated U1$f$, U2$f$ and U1$r$.

Figure 10:
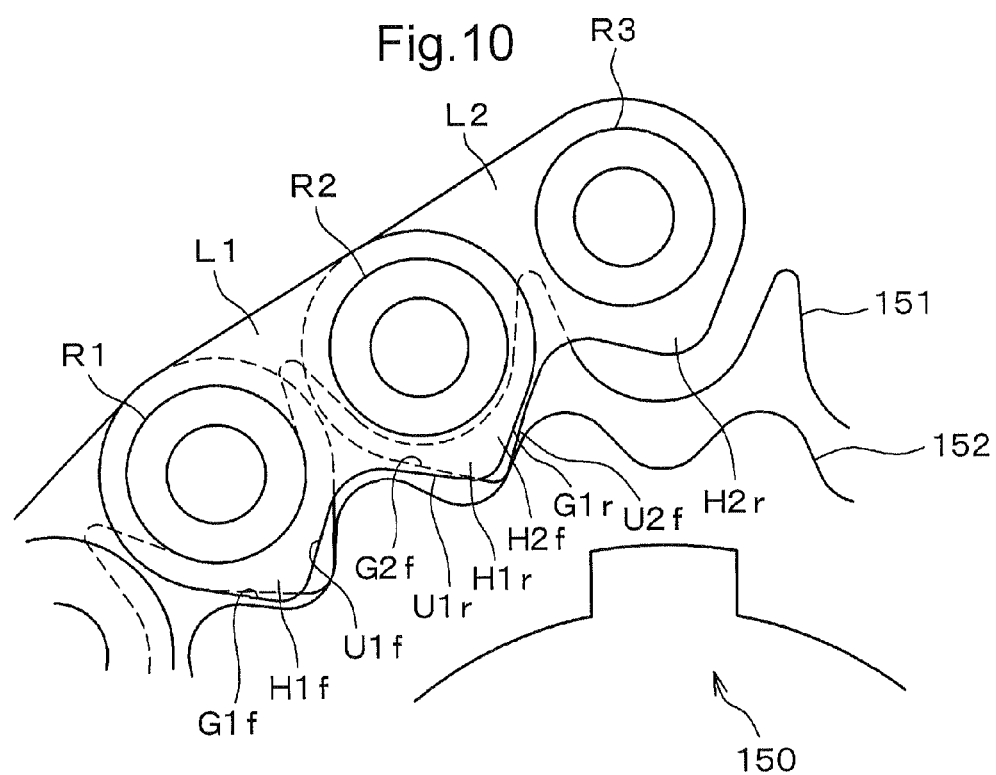
FIGS. 10-15 are schematic views illustrating the operation of the chain and the driving sprocket in FIG. 2.

The sequence of engagement begins with a stage, shown in FIG. 10, in which the roller R1 is seated on the roller driving sprocket teeth 151.

As the chain 110 advances link plate L1 is bent about the axis of roller R1, and roller R2 and the link plate tooth H1$r$ approach the driving sprocket 150. At the same time, tooth H2$f$ of link plate L2 also approaches the driving sprocket 150 and its inner flank U2$f$ comes into contact with a driving side sprocket tooth 152 before roller R2 and link plate tooth H1$r$ contact the sprocket.

The inner flank U2$f$ comes into sliding contact with a side sprocket tooth 152 as in a conventional silent chain. Consequently, only a small engagement noise is produced as the inner flank U2$f$ contacts the sprocket tooth.

Figure 11:
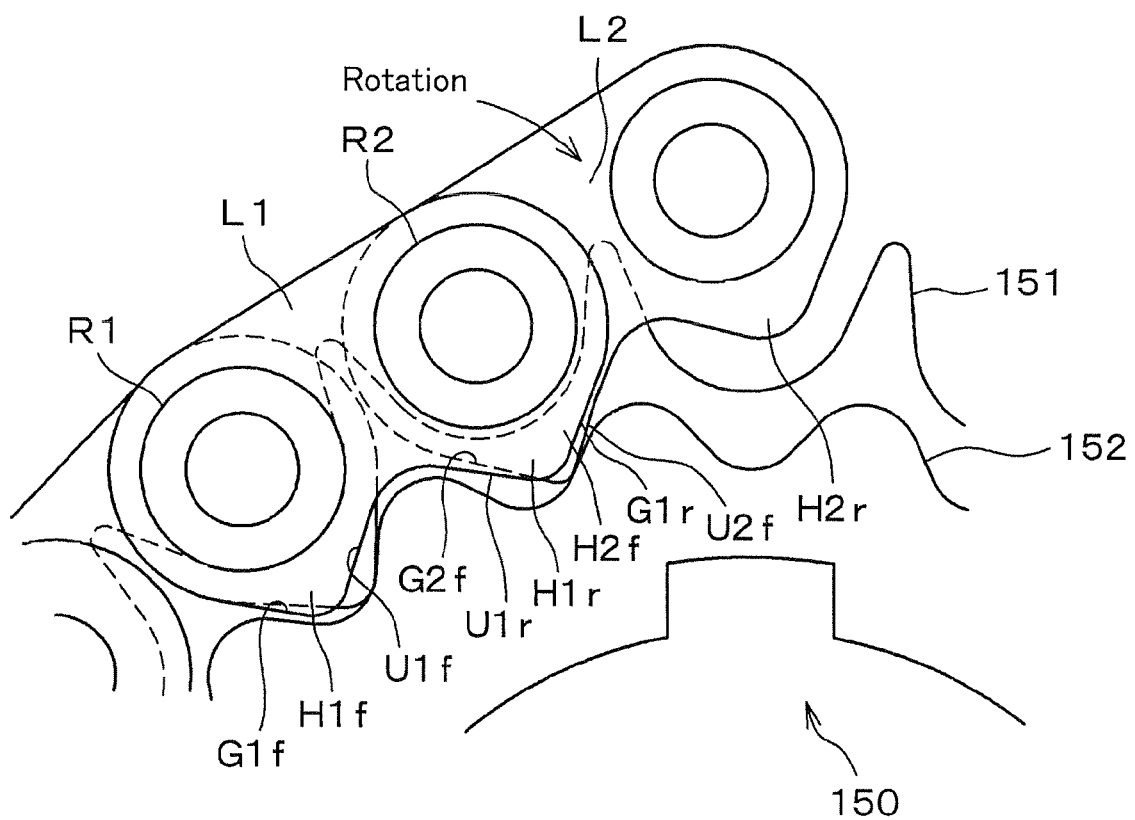

As the chain 110 continues to advance, the inner flank U2$f$ of link plate L2 starts bending while sliding on a tooth flank of a driving side sprocket tooth 152 as shown in FIG. 11, and the roller R2 gradually approaches the roller driving sprocket teeth 151.

Figure 12:
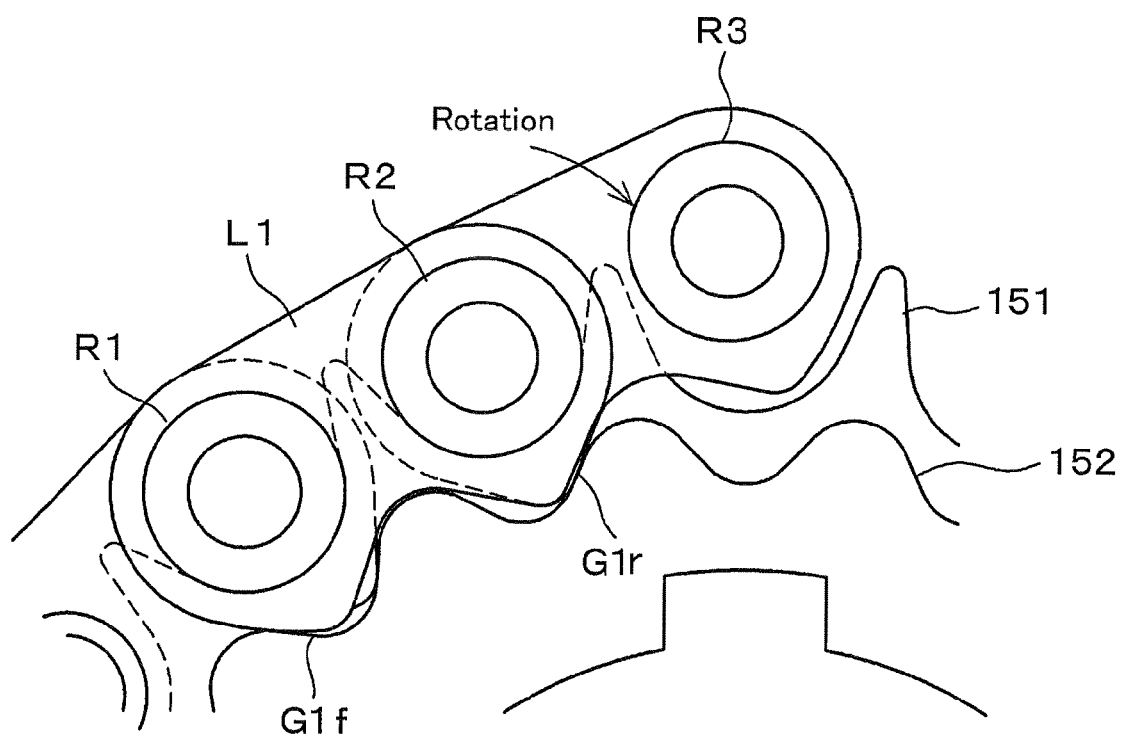

As shown in FIG. 12, winding of the link plate L1 onto the driving sprocket 150 is completed by contact of roller R2 with the roller driving sprocket teeth 151. Since contact of the roller R2 with the roller driving sprocket teeth 151 takes place gradually while the inner flank U2$f$ of the link plate L2 is restricted by sliding on a tooth flank of a driving side sprocket tooth 152, the magnitude of the noise generated by contact of the roller with the central sprocket teeth is much less than the magnitude of the noise generated in a transmission system using a conventional roller chain.

The shape of the link plates and the positions of the rollers are such that, when the both rollers R1 and R2 are seated on the roller driving sprocket teeth 151, outer flanks G1$f$ of the link plate L1 come into contact with the driving side sprocket teeth 152. Because the link plate L1 comes into contact with the driving side sprocket teeth 152 at two points on its outer flanks G1$f$, vibration and noise are reduced to a greater degree than in the case of the transmission system using a conventional roller chain.

Figure 13:
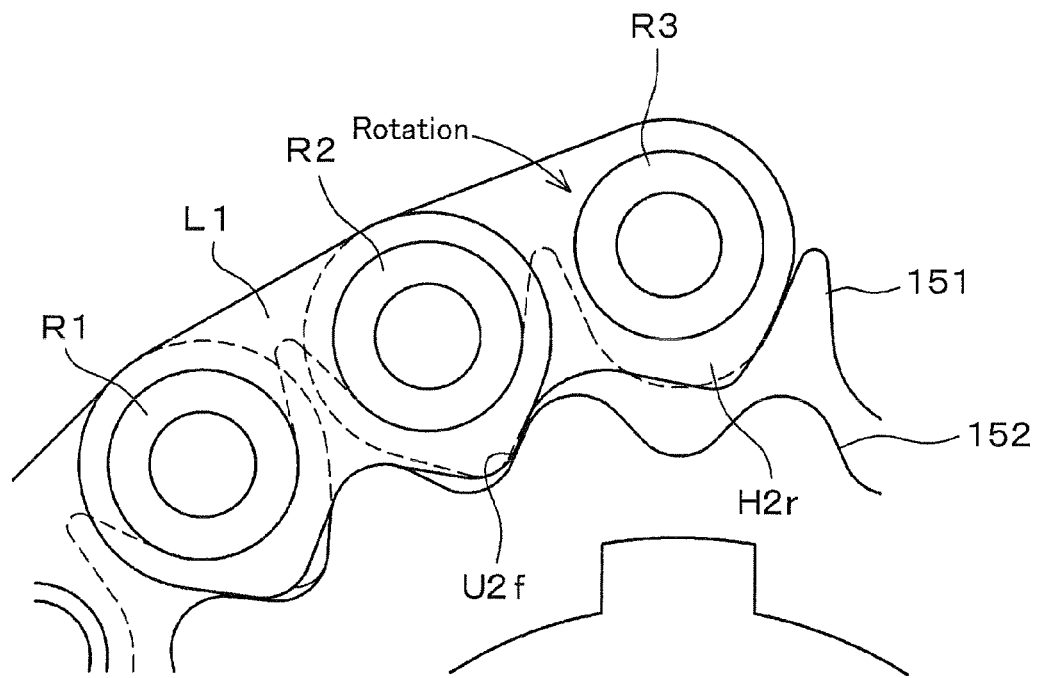
Figure 14:
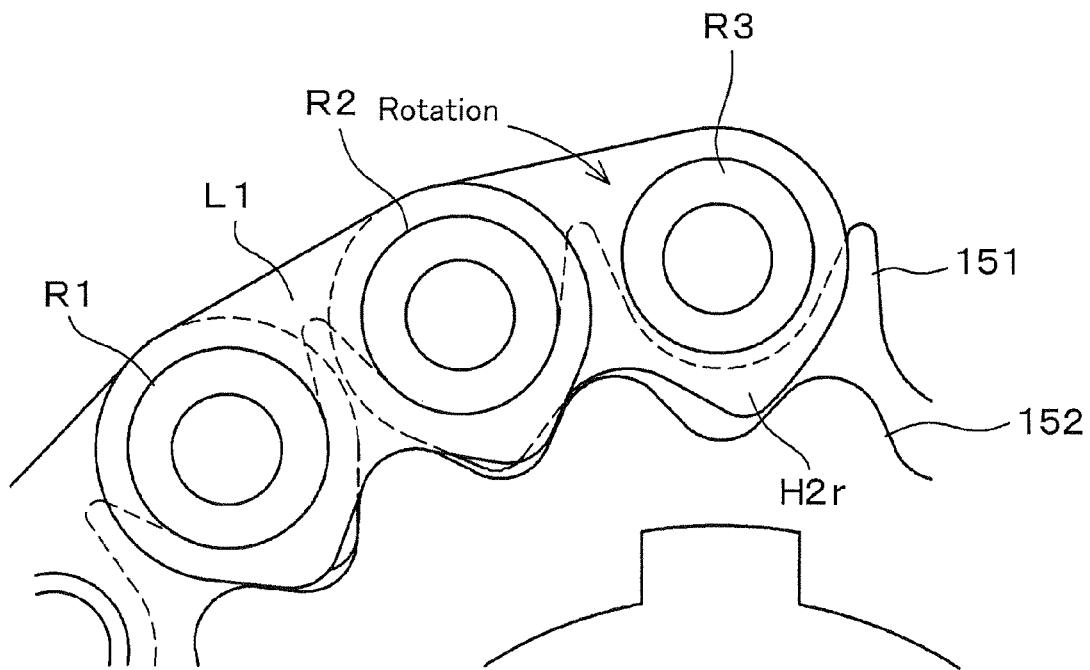

After seating of the rollers R1 and R2, as shown in FIG. 13, the following link plate L2 starts bending about the axis of roller R2, and its inner flank U2$f$ disengages from a tooth flank of the side sprocket teeth 152. As shown in FIG. 14, the link plate tooth H2$r$ of the link plate L2 and the roller R3 rapidly approach the driving sprocket 150.

Figure 15:
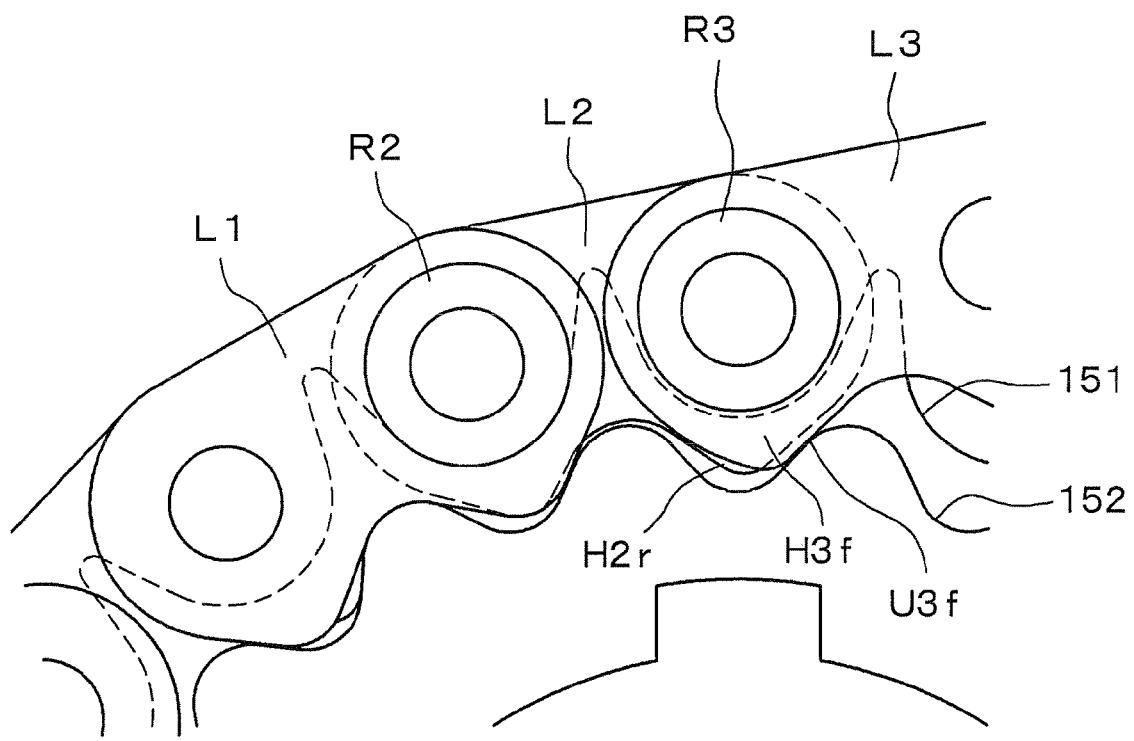

When the chain 110 continues to advance as shown in FIG. 15, the link plate L2 continues to bend about the roller R2, and the roller R3 and the link plate tooth H2$r$ of the link plate L2 approach the driving sprocket 150. However, at the same time, the link plate tooth H3$f$ of the following link plate L3 also approaches the driving sprocket 150, and the inner flank U3$f$ of link plate L3 comes into contact with the driving side sprocket teeth 152 before the roller R3 and the link plate tooth H2$r$ contact the sprocket. As a result, the transmission reaches a condition corresponding to that shown in FIG. 10, with the chain advanced by a distance corresponding to the chain pitch.

As the above-described cycle is repeated, the timing of contact between the link plates and the sprocket varies, and periodic vibration and noise corresponding to the number of sprocket teeth is reduced because the respective inner flanks 114Af, 114Ar, 114Bf and 114Br in FIGS. 6 and 7 have slightly different shapes.

An operation which is the reverse of that described above takes place when the chain disengages from the driving sprocket. The inner flank U2$f$ of link plate L2, for example, comes into contact with a tooth flank of a driving side sprocket tooth 152 as the chain advances from a condition corresponding to that shown in FIG. 13 to a condition corresponding to that shown in FIG. 12. The timing of disengagement also varies so that periodic vibration and noise levels corresponding to the number of sprocket teeth are reduced.

Thus, the timing of engagement of the link plate teeth with the driving side sprocket teeth 152 may be shifted by differentiating the shapes of the link plate teeth 113Bf and 113Br of the outer link plate 112 and the link plate teeth 113Af and 113Ar of the inner link plate 111, so that periodic vibration and noise can be considerably reduced.

The chain 110 may be arranged so that the respective outer flanks 115Af, 115Ar, 115Bf and 115Br are formed into a shape that barely contacts the driving side sprocket teeth 152. Conversely, the chain 110 may be arranged so that the roller 120 barely contacts the roller driving sprocket teeth 151, and the power transmission function is performed almost entirely by the link plate teeth 113 and the driving side sprocket teeth 152 in a manner similar to power transmission using a conventional silent chain.

The chain 110 may be arranged so that the outer flanks 115Af, 115Ar, 115Bf and 115Br are formed into a shape that comes into contact first with the driving sprocket 150 when the chain 110 is wound around the driving sprocket 150. In that case, the outer flanks 115Af, 115Ar, 115Bf and 115Br may be formed so as to have different shapes, and the inner flanks 114Af, 114Ar, 114Bf and 114Br may be formed so as to have the same shape.

The tension-side driven sprocket 170 of the timing chain driving system of the first embodiment of the invention has a cyclically varying tooth pitch.

When the timing chain driving system is applied, for example, to an in-line four-cylinder DOHC engine, fluctuations in the rotational speed occur at the rate of two cycles for each rotation of the driving shaft, i.e., four cycles for each rotation of the driven sprocket. Accordingly, the tension side driven sprocket 170 is arranged so that the tooth pitch of the sprocket teeth 171 varies through four cycles as shown in FIG. 16. That is, the pitch of the sprocket teeth 171 increases and decreases cyclically so that the maximum pitch Pmax, where the pitch is widest, and the minimum pitch Pmin, where the pitch is narrowest, alternate at intervals of 45 degrees. Thus, the rate of arrival of the sprocket teeth 171 at the point at which the chain disengages from the sprocket is cyclically advanced and retarded, effectively changing the slack or the tension in the span of the chain traveling from the driven sprocket 170 toward the driving sprocket 150.

As shown in FIG. 16, marks 172 indicate the Pmin positions where the pitch is smallest and marks 173 indicate the Pmax positions where the pitch is widest. These marks are placed in the vicinity of the sprocket teeth 171 on a side of the driven sprocket 170.

The tooth pitch variations are exaggerated in FIG. 16 for the purpose of explanation. The actual pitch variation may be only around 0.2 mm with reference to the usual pitch in an ordinary in-line four-cylinder DOHC engine where the length of the tension span of the chain between the driven sprocket and the driving sprocket is around 300 mm. This small pitch variation is difficult to see and does not affect the engagement of the sprocket with the chain 110. The marks facilitate visual confirmation of the positions of Pmax and Pmin in assembly or repair of the engine timing drive.

As shown in FIGS. 17A through 17D, the chain 110 is engaged with the tension-side driven sprocket 170 through an angle of about 90 degrees, and causes the sprocket to rotate clockwise. The chain disengages from sprocket 170 at a disengagement point K. The locations of Pmax, where the pitch of the sprocket teeth 171 is widest, are indicated schematically by white sections and the locations of Pmin, where the pitch is narrowest are indicated by black sections. The pitch varies according to a sinusoidal curve in the present embodiment.

Figure 17A:
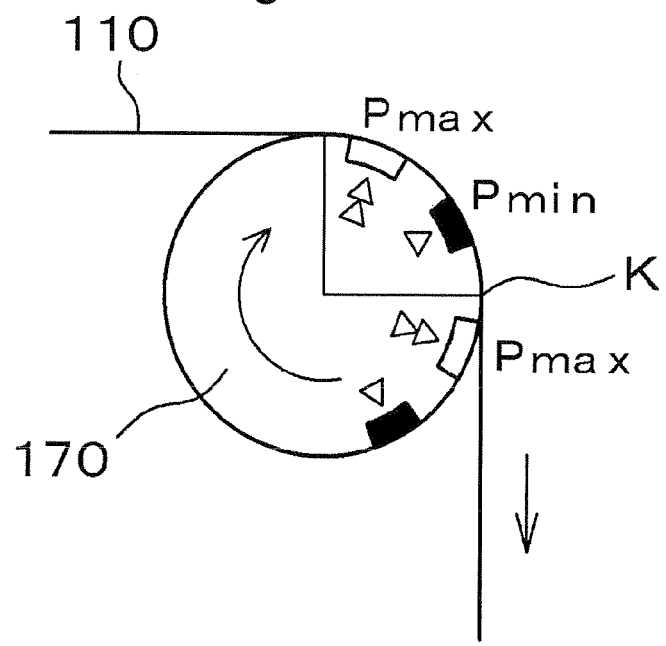
FIGS. 17A, 17B, 17C and 17D are schematic views illustrating successive stages in the operation of the chain and the driven sprocket of FIG. 16.

In FIG. 17A, a Pmax point on the tension-side driven sprocket 170 has passed through the disengagement point K, and a Pmin point is approaching the disengagement point. The pitch of the teeth at the disengagement point K is decreasing at a maximum rate, and the tooth pitch at the disengagement point K corresponds to a standard tooth pitch. All of the teeth having a pitch wider than the standard pitch have passed through the disengagement point K.

Figure 17B:
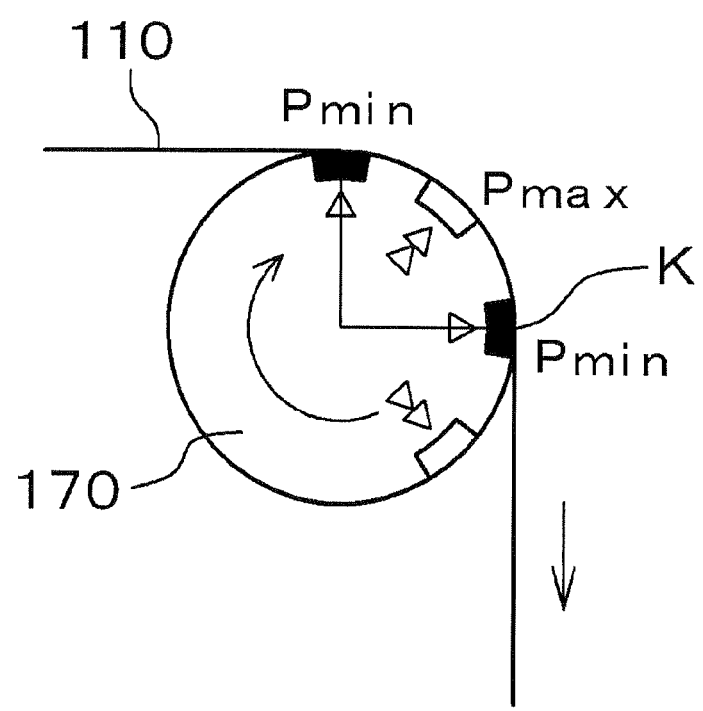

In FIG. 17B, the pitch at the disengagement point K is Pmin, and the rate of change of tooth pitch is zero. On the other hand, because the tooth pitch at the disengagement point is at a minimum, the rate at which teeth are passing through the disengagement point K is at a maximum.

Figure 17C:
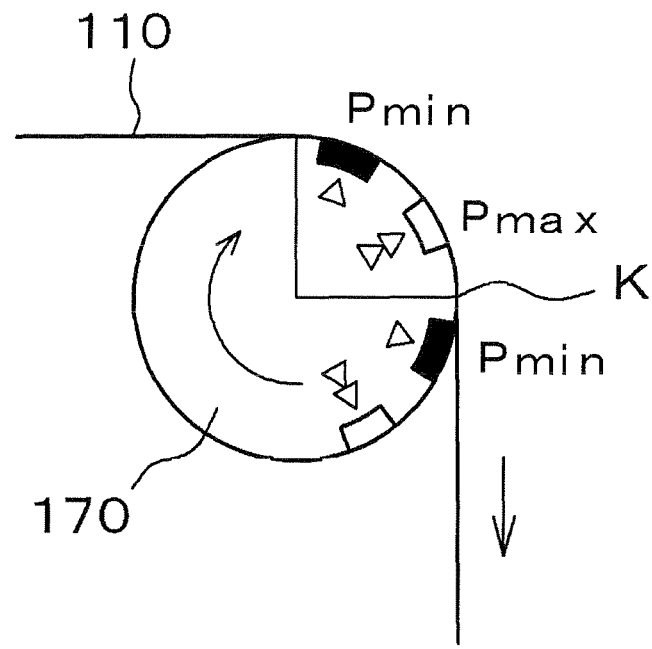

In FIG. 17C, Pmin has passed through the disengagement point K and Pmax is approaching the disengagement point. The pitch of the teeth at the disengagement point K is becoming wider at the maximum rate, and all of the teeth having a pitch narrower than the standard pitch have passed through the disengagement point K.

Figure 17D:
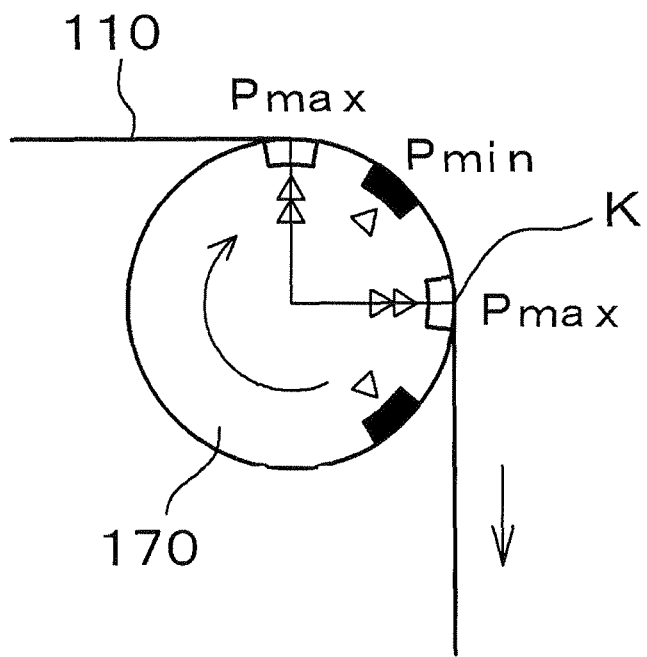

In FIG. 17D, the pitch of the teeth at the disengagement point K is maximum, the rate of change of tooth pitch at the disengagement point is zero and the rate at which the sprocket teeth approach the disengagement point is at a minimum.

Figure 18:
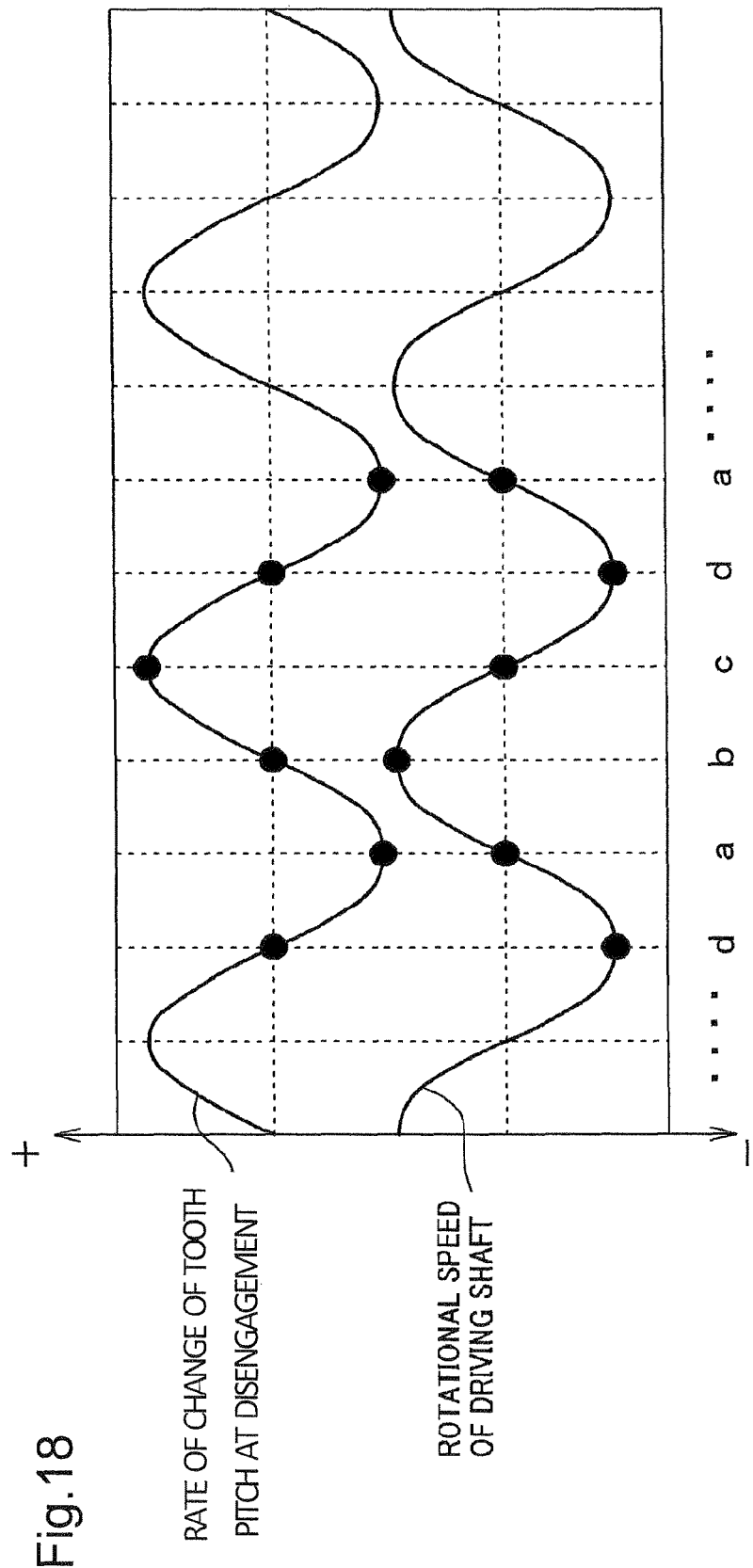
FIG. 18 is a graph showing the relationship between the rate of change of the rate of arrival of teeth of the driven sprocket at a disengagement point K, and the rotational speed of the driving sprocket during the operation shown in FIGS. 17A-17D.

The effective length tension span of the chain between the driven sprocket 170 and the driving sprocket cyclically changes as a result of the cyclic pitch variation of the sprocket teeth. FIG. 18 illustrates the relationship between rate of change of the pitch of the driven sprocket teeth 171 at the disengagement point K to fluctuations of rotational speed of the driving sprocket 150. Points a through d in FIG. 18 correspond to the states shown in FIGS. 17A through 17D, respectively.

At point a, the rate of arrival of teeth at the disengagement point K is increasing at a maximum rate, and this is why the upper graph in FIG. 18 is farthest below the reference line at point a. At the same time, the rotational speed of the driving shaft is increasing.

The increasing rate of arrival of teeth at the disengagement point K tends to decrease the tension in the chain, thereby compensating for increasing tension caused by the increasing rate of rotation of the driving sprocket.

At point b, a Pmin point on the sprocket is at the disengagement point K, the rate of arrival of sprocket teeth at point K is at a maximum, and the change in the rate of arrival of teeth at point K is zero. Point b coincides in time with the point at which the rotational speed of the driving sprocket is at a maximum. The reduction in tension in the tension span of the chain resulting from the higher rate at which sprocket teeth arrive at the disengagement point K continues to compensate for increased tension caused by the high rate of rotation of the driving sprocket.

At point c, the rate of arrival of teeth at the disengagement point K is decreasing at a maximum rate, and this is why the upper graph in FIG. 18 is farthest above the reference line at point c. At the same time, the rotational speed of the driving shaft is decreasing. The decrease in the rate of arrival of teeth at the disengagement point tends to increase tension in the tension span of the chain, thereby compensating for the decrease in tension resulting from the decrease in the rotational speed of the driving sprocket.

At point d, a Pmax position on the sprocket is at the disengagement point K. The rate of arrival of teeth at the disengagement point is at a minimum, and the rate of change in the rate of arrival of teeth at the disengagement point is zero. The point at which the rotational speed of the driving sprocket is lowest coincides with this point d.

It will be seen that the rate of arrival of teeth at the disengagement point on the driven sprocket is lowest when the rotational speed of the driving sprocket is at a minimum, and the rate of arrival of teeth at the disengagement point on the driven sprocket is highest when the rotational speed of the driving sprocket is at a maximum. By synchronizing the phase of the driven roller sprocket teeth 171 with the fluctuations in the rotational speed in an optimum phase relationship as described above, it is possible to absorb fluctuations in rotational speed effectively without displacement or application of force in a direction other than the direction of chain travel. An advantage of this arrangement is that, by reducing the maximum tension applied to the chain, the chain can be downsized and made lighter in weight. As a result, the overall chain driving system can be downsized, made lighter in weight, and simplified by reducing the number of moving parts. At the same time, noise caused by vibration of the chain can be reduced.

Figure 19C:
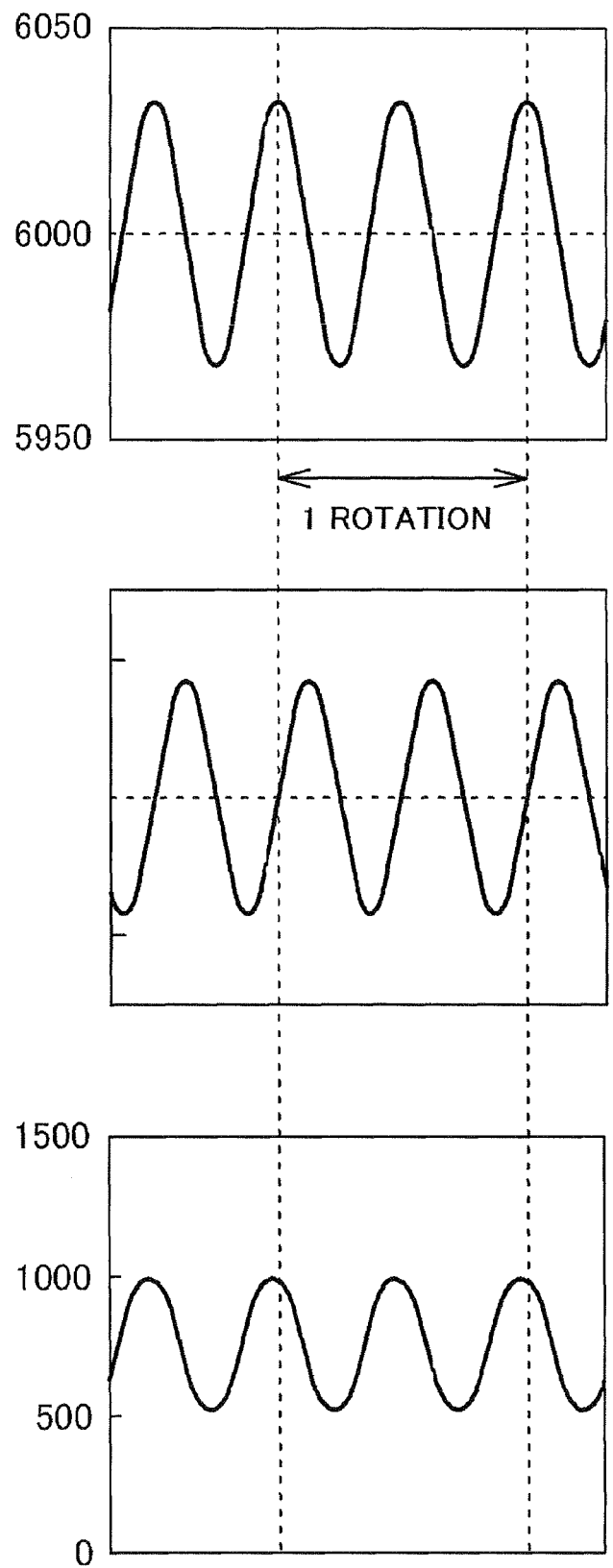
FIGS. 19A, 19B and 19O are graphs comparing experimental results of experiments carried out on the chain driving system according to the first embodiment of the invention and a chain driving system using a standard driven sprocket but otherwise similar to the first embodiment.

FIGS. 19A and 19B are graphs showing the results of measurements of peak tension carried out on an in-line four-cylinder engine using a standard driven sprocket, i.e. one in which there is no variation in the tooth pitch of the driven sprocket. The absence of variation in the tooth pitch of the driven sprocket is represented by the middle graphs in FIGS. 19A and 19B. FIG. 19C is a similar graph showing results of measurements of peak tension carried out on the same engine using a driven sprocket according to the invention in which the tooth pitch cyclically increases and decreases.

In FIG. 19A, the crankshaft causes no fluctuation of rotational speed. The tension in the chain fluctuates slightly due to load fluctuations, resulting from operation of the engine camshaft.

In FIG. 19B, the crankshaft rotational speed fluctuates, and a large fluctuation in chain tension is generated in synchronism with the fluctuations in rotational speed.

In FIG. 19C, the crankshaft rotational speed fluctuates as in FIG. 19B, but the tooth pitch of the driven sprocket cyclically increases and decreases in accordance with the invention. Most of the fluctuation in tension associated with the fluctuation in rotational speed of the crankshaft sprocket is absorbed by setting the driven sprocket so that the pitch of its teeth at the disengagement point is minimized at the rotational angles at which the rotational speed of the driving sprocket is maximum. The remaining, relatively minor, fluctuations in tension, caused by load fluctuations, are similar to those shown in FIG. 19A.

In the example illustrated in FIG. 19C, the crankshaft is set to rotate at 6,000 rpm. The chain driving system exhibits greater tension moderating effect at higher rotational speeds.

Although in the embodiment described, the advancement and retardation of the arrival of sprocket teeth at the disengagement point and the cyclic fluctuations in the rotational speed of the driving sprocket follow sinusoidal curves, the curve representing the rate of change in the rate of arrival of sprocket teeth at the disengagement point can be appropriately set so that, even if the actual fluctuation in the rotational speed of the driving sprocket is not sinusoidal, the rate of arrival of driven sprocket teeth at the disengagement point K is greatest when the rotational speed of the driving sprocket is at its maximum value and the rate of arrival of driven sprocket teeth at the disengagement point is lowest when the rotational speed of the sprocket is at its minimum value.

Although the sprocket in which the tooth pitch cyclically increases and decreases is the driven sprocket in the embodiment described, as an alternative, the driving sprocket can have a cyclically increasing and decreasing tooth pitch, and as a further alterative, both the driving sprocket and the driven sprocket can have a cyclically increasing and decreasing tooth pitch.

When the driving sprocket has a cyclically increasing and decreasing tooth pitch, the tension span of the chain advances toward the driving sprocket, and the relationship of the phase of the tooth pitch at the engagement point on the driving sprocket to the rotational speed of the driving sprocket is the reverse of the corresponding relationship in the driven sprocket. That is, at a maximum driving sprocket rotational speed, a Pmax point on the driving sprocket should be at the engagement point. Similarly, in the case in which both sprockets have a cyclically varying pitch, when a Pmin point on the driven sprocket is at the disengagement point K, a Pmax point on the driving sprocket should be at the engagement point.

The use of a cyclically varying tooth pitch also makes it possible to prevent various vibrations and noises associated with vibrational resonance and sonic resonance other than cyclic fluctuations in rotational speed.

Because the marks on the side of the sprocket allow identification of the positions where the pitch of the sprocket teeth becomes largest and the positions where the pitch of the sprocket teeth becomes smallest, it is possible to specify these positions accurately even though the pitch variation is very small. With this arrangement the tooth that sustain the largest load can be'readily specified, the phases of the sprockets can be readily adjusted, and assembly and maintenance can be performed efficiently by using the marks also as timing marks.

Figure 20:
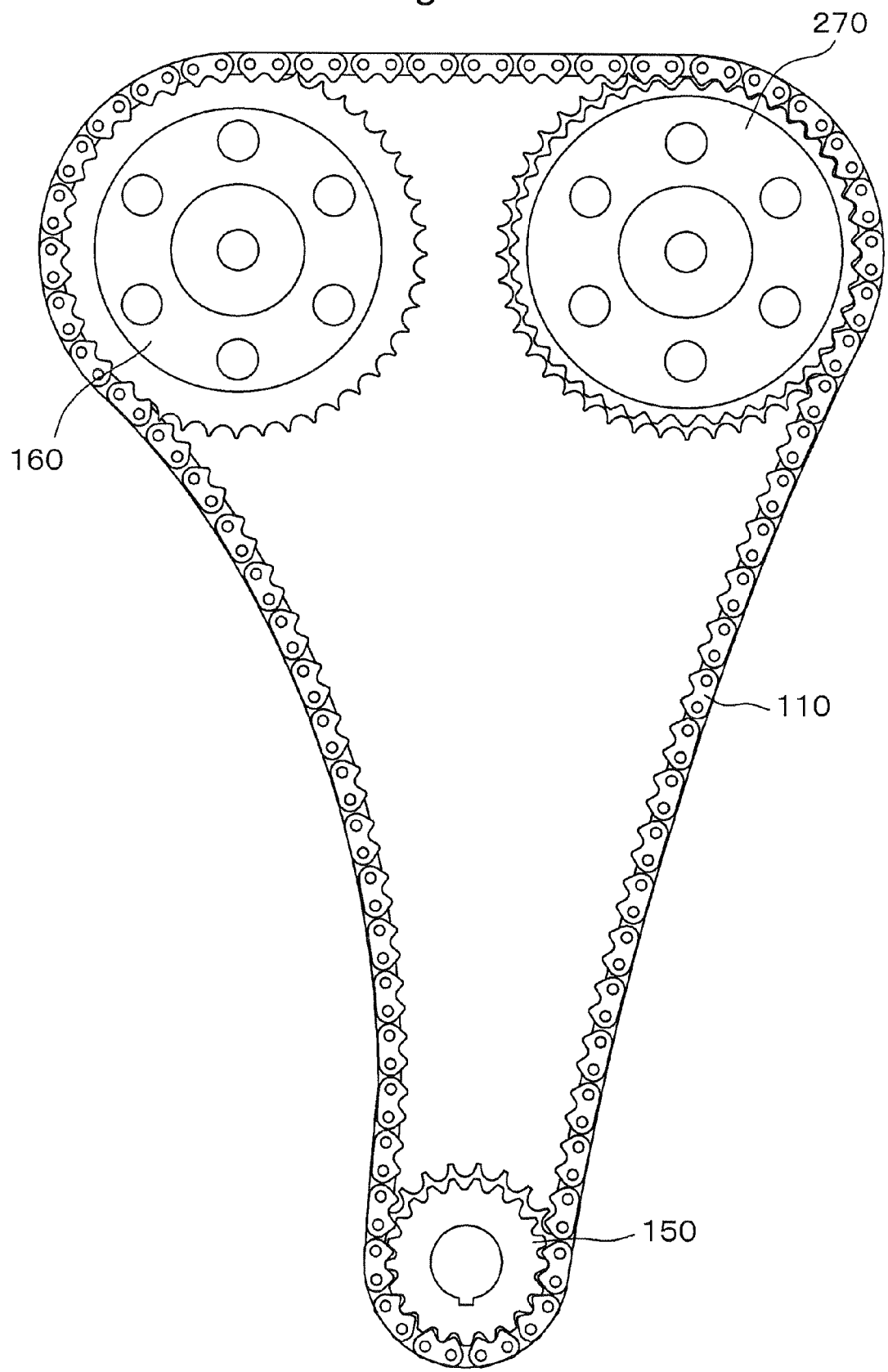
FIG. 20 is a schematic elevational view of a chain and sprockets in a timing chain driving system according to a second embodiment of the invention is a schematic layout of a chain and sprockets of a timing chain driving system of a second embodiment of the invention.
Figure 21:
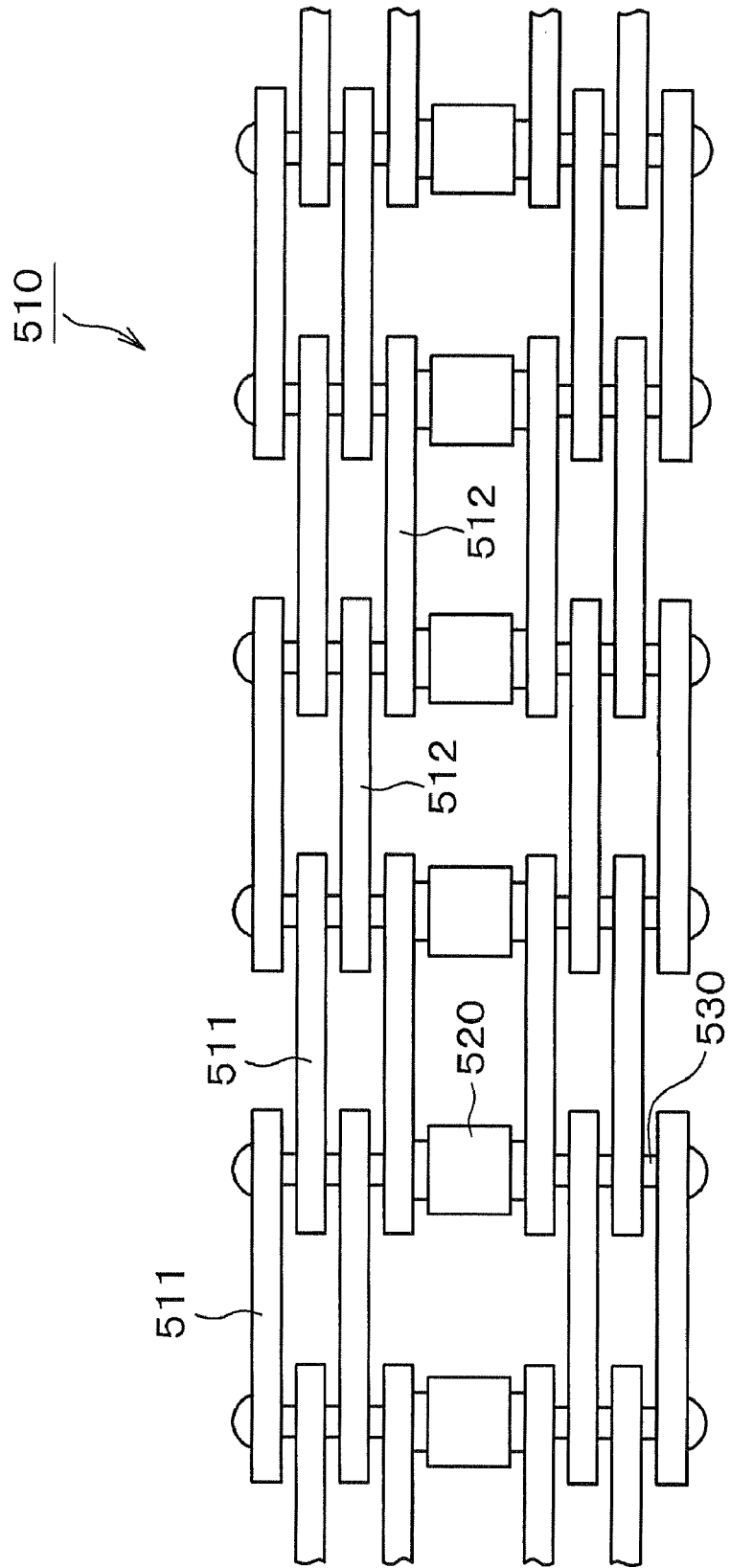
FIG. 21 is a plan view of a chain of a prior art timing chain driving system.
Figure 22:
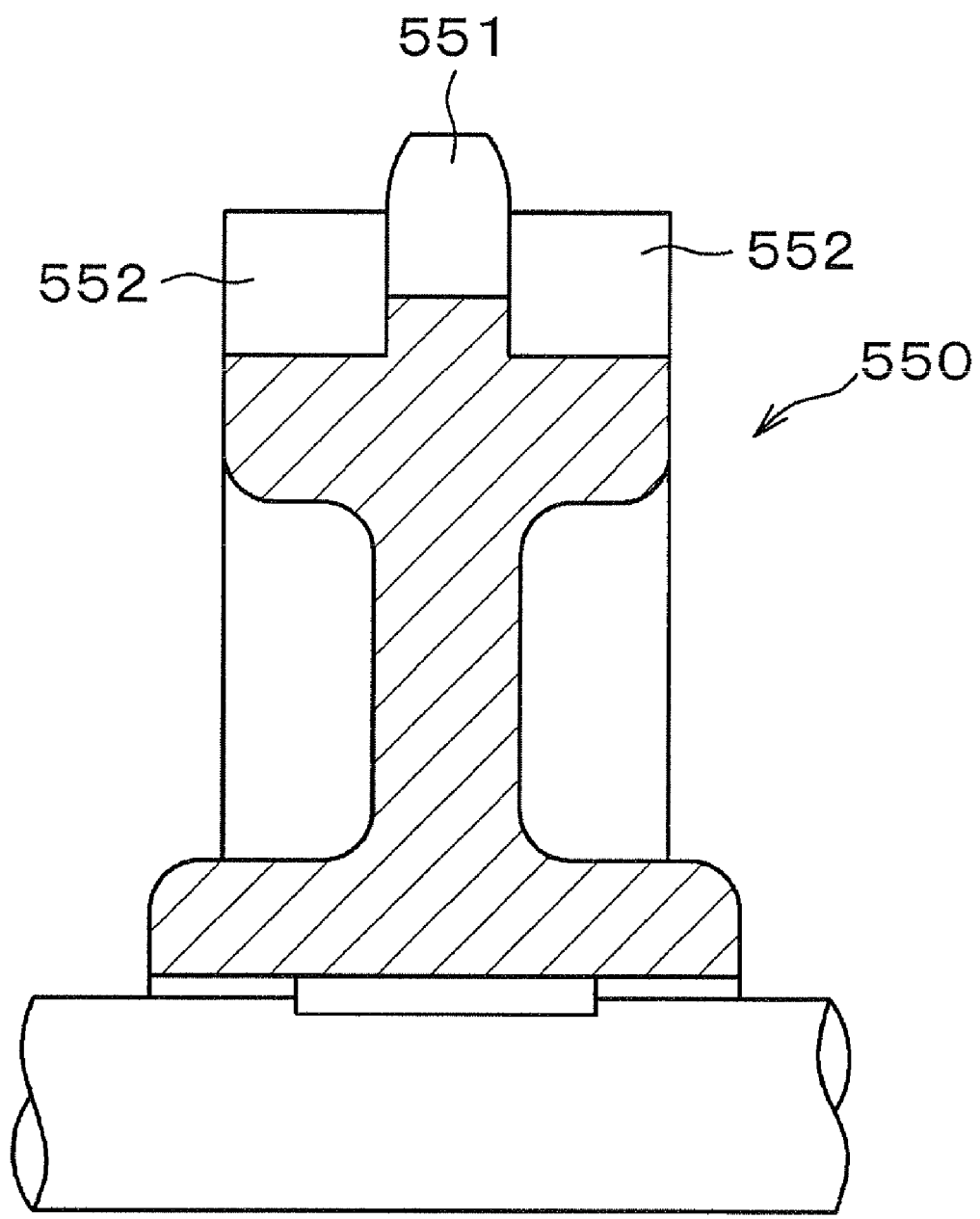
FIG. 22 is a section view of the sprocket of the prior art timing chain driving system.

As shown in FIG. 20, in a timing chain driving system according to a second embodiment of the invention, the driving sprocket 150 is similar to the driving sprocket of the first embodiment, having roller driving sprocket teeth that engage rollers of the chain 110, and driving side sprocket teeth on one or both sides of the roller driving sprocket teeth, that engage teeth of the link plates of the chain 110.

In this second embodiment, however, the tension-side driven sprocket 270 also has both driven roller sprocket teeth that engage the rollers of the chain 110 and driven side sprocket teeth on one or both sides of the driven roller sprocket teeth that engage teeth of the link plates of the chain 110. In addition, the pitch of the teeth cyclically increases or decreases in the peripheral direction with phases synchronized with fluctuations in the rotational speed of the driving sprocket or with cyclic fluctuations in the load imposed on the driven sprocket.

Engagement and disengagement of the tension-side driven sprocket 270 with the chain 110 are the same as the engagement and disengagement of the driving sprocket 150 with the chain 110 in the first embodiment and the function of the tooth pitch variations is the same as in the first embodiment.

In the embodiment shown in FIG. 20, the pitch of the side teeth of the driven sprocket 270 preferably varies cyclically in the same manner as the pitch of the roller-engaging teeth of sprocket 270 varies, in order to avoid large changes in the tension in the span of the chain traveling from driven sprocket 270 toward driving sprocket 150.

Although the loose-side driven sprocket 160 in FIG. 20 has only driven roller sprocket teeth, it can also be provided with side sprocket teeth similar to those on the tension-side driven sprocket 270. In addition, the pitch of the teeth on sprocket 160 can increase or decrease cyclically in the peripheral direction with phases synchronized with fluctuations of rotational speed of the driving sprocket or with the cyclic fluctuations of load applied to sprocket 160 through its driven shaft.

In the timing chain driving system in accordance with the invention, the driving sprocket, which has a large engagement load and is prone to generate noise, is provided with the functions of a roller chain and a silent chain, and the pitch of the teeth of the tension-side driven sprocket cyclically increase and decrease around its circumference in order to compensate for tension variations without applying displacement or force to the chain other than in the direction of chain travel. The combined effect of these features brings about remarkable advantages in that it becomes possible to prevent the strength of the chain from dropping due to elongation of the chain otherwise caused by wear of the connector pins, to reduce the noise level produced by engagement of the chain with the sprockets, to downsize and reduce the weight of the chain, and to prevent vibration and noise caused by the fluctuations in tension.

What is claimed is:

1. A timing chain driving system comprising:
a driving sprocket having an axis of rotation;
at least one driven sprocket; and
a chain in meshing engagement with said sprockets for conveying rotational force from the driving sprocket to each said driven sprocket while maintaining the angular rotations of said sprockets in a predetermined phase relationship; wherein:
the chain comprises outer links and inner links in alternating, overlapping relationship;
each outer link comprises a pair of outer link plates in laterally spaced relationship;
the outer link plates of each pair are connected by a pair of connecting pins secured respectively in front and rear pin holes in said pair of outer link plates;
each inner link comprises a pair of inner link plates in laterally spaced relationship;
the inner link plates of each pair are connected by a pair of bushings secured respectively in front and rear bushing holes in said pair of inner link plates;
each connecting pin of each outer link extends through, and is rotatable in, a bushing of an overlapping inner link;
each of said outer link plates and each of said inner link plates is formed with front and rear link plate teeth;

said driving sprocket has central sprocket teeth which engage with said bushings or with rollers rotatable on said bushings, the central sprocket teeth having tooth gap bottoms and tips; and said driving sprocket also has side sprocket teeth which engage with said link plate teeth, the side sprocket teeth also having tooth gap bottoms and tips;

in which the tooth gap bottoms of the central sprocket teeth are farther than the tooth gap bottoms of the side sprocket teeth from said axis, and the tips of the central sprocket teeth are also farther than the tips of the side sprocket teeth from said axis;

in which the angular pitch of the side sprocket teeth is the same as the angular pitch of the central sprocket teeth;

in which the tooth gap bottoms of the central sprocket teeth are at the same angular positions as the tooth gap bottoms of the side sprocket teeth and the tips of the central sprocket teeth are also at the same angular positions as the tips of the side sprocket teeth; and in which each of the teeth of each of the link plates has an inner and outer flank, wherein the inner flanks of the front and rear teeth of each of said outer link plates have different shapes and wherein the inner flanks of the front and rear teeth of each of said inner link plates also have different shapes.

2. A timing chain driving system comprising:

a driving sprocket having an axis of rotation;

at least one driven sprocket; and a chain in meshing engagement with said sprockets for conveying rotational force from the driving sprocket to each said driven sprocket while maintaining the angular rotations of said sprockets in a predetermined phase relationship; wherein:

the chain comprises outer links and inner links in alternating, overlapping relationship;

each outer link comprises a pair of outer link plates in laterally spaced relationship;

the outer link plates of each pair are connected by a pair of connecting pins secured respectively in front and rear pin holes in said pair of outer link plates;

each inner link comprises a pair of inner link plates in laterally spaced relationship;

the inner link plates of each pair are connected by a pair of bushings secured respectively in front and rear bushing holes in said pair of inner link plates;

each connecting pin of each outer link extends through, and is rotatable in, a bushing of an overlapping inner link;

each of said outer link plates and each of said inner link plates is formed with front and rear link plate teeth;

said driving sprocket has central sprocket teeth which engage with said bushings or with rollers rotatable on said bushings, the central sprocket teeth having tooth gap bottoms and tips; and said driving sprocket also has side sprocket teeth which engage with said link plate teeth, the side sprocket teeth also having tooth gap bottoms and tips;

in which the tooth gap bottoms of the central sprocket teeth are farther than the tooth gap bottoms of the side sprocket teeth from said axis, and the tips of the central sprocket teeth are also farther than the tips of the side sprocket teeth from said axis;

in which the angular pitch of the side sprocket teeth is the same as the angular pitch of the central sprocket teeth;

in which the tooth gap bottoms of the central sprocket teeth are at the same angular positions as the tooth gap bottoms of the side sprocket teeth and the tips of the central sprocket teeth are also at the same angular positions as the tips of the side sprocket teeth;

in which the timing chain driving system includes a driven shaft fixed to and rotatable with the each said driven sprocket; and in which the pitch of the teeth of said at least one driven sprocket cyclically increases and decreases around the periphery of said at least one driven sprocket, the phase of the cyclic increase and decrease of said pitch is synchronized with fluctuations of rotational speed of the driving sprocket or with cyclic fluctuations in the load on said at least one driven sprocket, and the pitch of the teeth of said at least one driven sprocket, at the location at which the chain disengages from said at least one driven sprocket is at a minimum as the rotational speed of the driving sprocket is maximum or the load of the driven shaft fixed to said at least one driven sprocket reaches a peak.

* * * * *